(12) United States Patent
Kosaka et al.

(10) Patent No.: US 8,967,687 B2
(45) Date of Patent: Mar. 3, 2015

(54) BUMPER REINFORCEMENT STRUCTURE

(75) Inventors: Naoya Kosaka, Miyoshi (JP); Shinji Miwa, Nagoya (JP); Keisuke Shibata, Miyoshi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/639,803

(22) PCT Filed: Apr. 9, 2010

(86) PCT No.: PCT/JP2010/056466
§ 371 (c)(1),
(2), (4) Date: Nov. 8, 2012

(87) PCT Pub. No.: WO2011/125223
PCT Pub. Date: Oct. 13, 2011

(65) Prior Publication Data
US 2013/0119680 A1    May 16, 2013

(51) Int. Cl.
*B60R 19/04*    (2006.01)
*B60R 19/18*    (2006.01)

(52) U.S. Cl.
CPC .............. *B60R 19/04* (2013.01); *B60R 19/18* (2013.01); *B60R 2019/1806* (2013.01); *B60R 2019/1813* (2013.01)
USPC ...................... 293/155; 293/102; 296/187.09

(58) Field of Classification Search
CPC  B60R 19/18; B60R 19/04; B60R 2019/1806; B60R 2019/1813
USPC ......... 293/102, 155, 130, 120, 121, 154, 122, 293/132; 296/187.09
See application file for complete search history.

(56) References Cited

U.S. PATENT DOCUMENTS

| | | | |
|---|---|---|---|
| 6,360,441 B1 * | 3/2002 | Himsl et al. ................. | 29/897.2 |
| 2002/0040525 A1 | 4/2002 | Himsl et al. | |
| 2008/0054655 A1 * | 3/2008 | Kizaki et al. .................. | 293/133 |
| 2008/0093867 A1 * | 4/2008 | Glasgow et al. .............. | 293/102 |
| 2009/0058111 A1 * | 3/2009 | Perarnau Ramos et al. .. | 293/120 |

FOREIGN PATENT DOCUMENTS

| | | |
|---|---|---|
| JP | 02-078451 U | 6/1990 |
| JP | 4-55910 A | 9/1992 |
| JP | 06-135290 A | 5/1994 |
| JP | 6-321033 A | 11/1994 |

(Continued)

OTHER PUBLICATIONS

International Search Report mailed Jul. 6, 2010 of PCT/JP2010/056466.

*Primary Examiner* — Glenn Dayoan
*Assistant Examiner* — Melissa A Black
(74) *Attorney, Agent, or Firm* — Kenyon & Kenyon LLP

(57) ABSTRACT

A bumper reinforcement structure capable of achieving a weight reduction while still securing required bending strength in a bumper reinforcement structure with closed cross-section structure configured by joining together an inside member and an outside member. A bumper reinforcement is formed with two closed cross-sections configured by joining together three top-to-bottom flanges of an inner panel to three top-to-bottom flanges of an outer panel. The flanges of the inner panel are disposed in the same front-rear direction position as that of the wall portions that configure the closed cross-sections.

7 Claims, 26 Drawing Sheets

(56) References Cited

FOREIGN PATENT DOCUMENTS

| | | |
|---|---|---|
| JP | 11-059296 A | 3/1999 |
| JP | 2000-72032 A | 3/2000 |
| JP | 2000-198401 A | 7/2000 |
| JP | 2001-199293 A | 7/2001 |
| JP | 2001-239903 A | 9/2001 |
| JP | 2005-271734 A | 10/2005 |
| JP | 2006-036079 A | 2/2006 |
| JP | 2006-044308 A | 2/2006 |
| JP | 2008-080924 A | 4/2008 |
| JP | 2008-080925 A | 4/2008 |
| JP | 2010-047226 A | 3/2010 |
| WO | 2009/107670 A1 | 9/2009 |

* cited by examiner

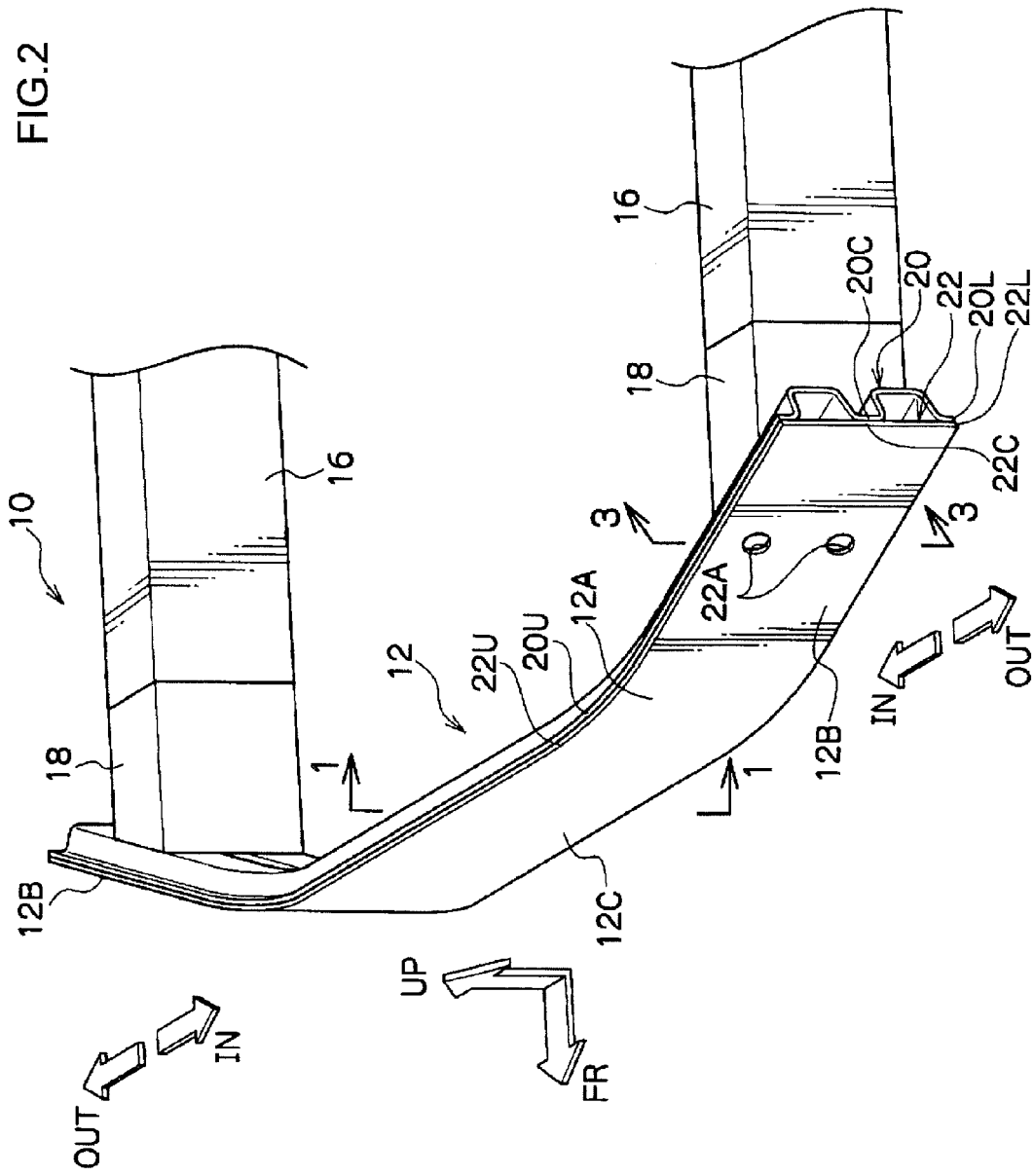

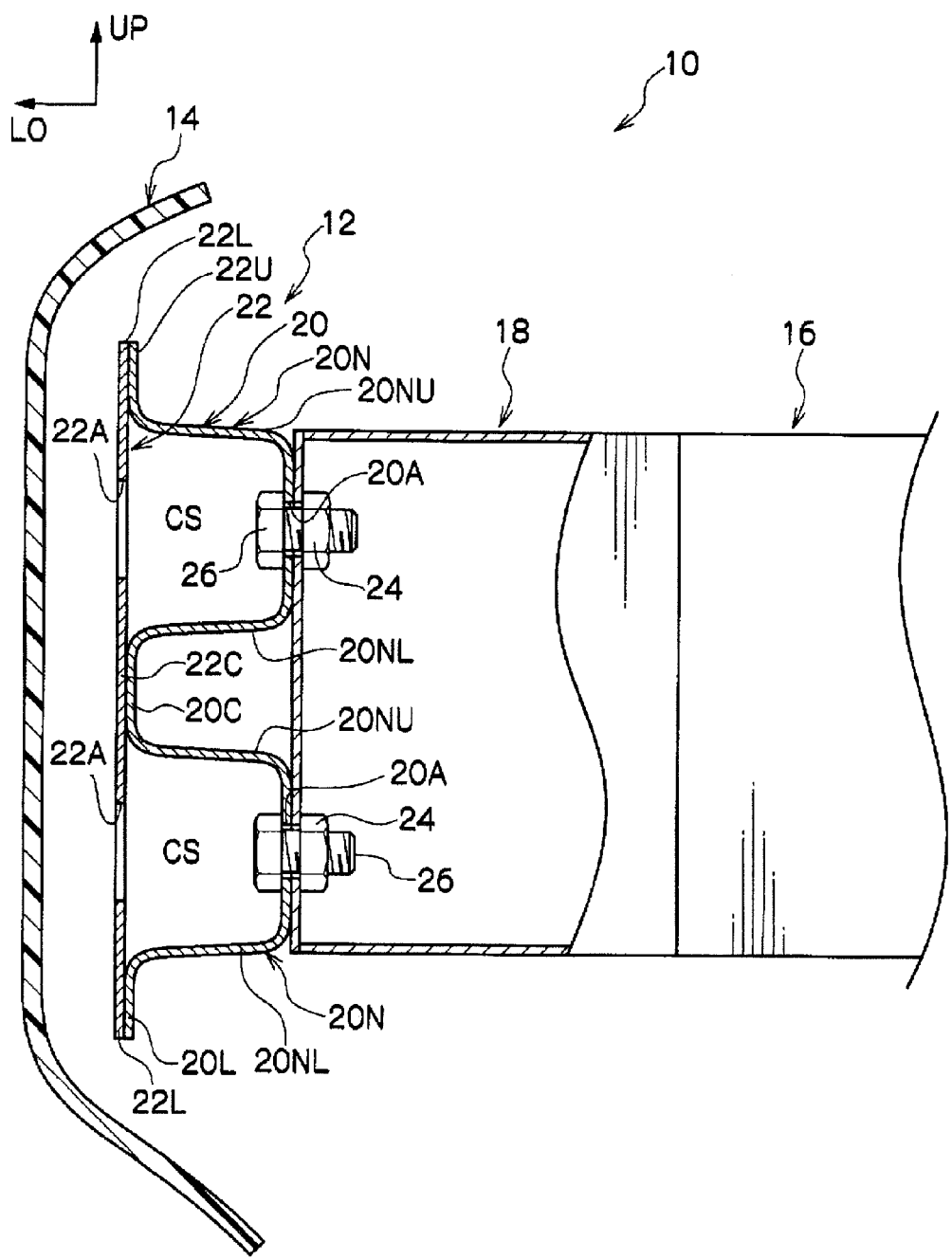

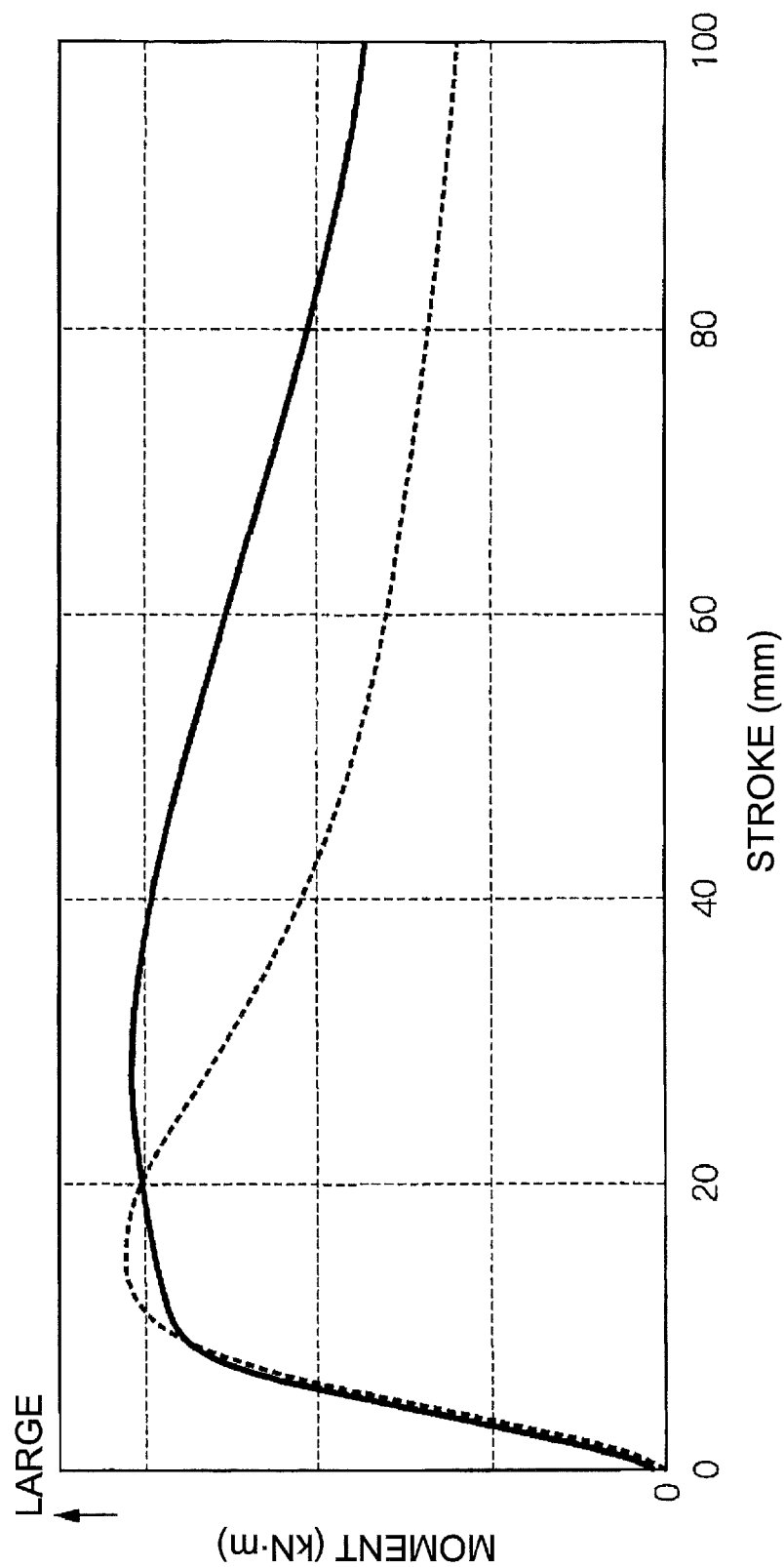

BUMPER REINFORCEMENT STRUCTURE

This is a 371 national phase application of PCT/JP2010/056466 filed 9 Apr. 2010, the contents of which are incorporated herein by reference.

TECHNICAL FIELD

The present invention relates to a bumper reinforcement structure.

BACKGROUND ART

Bumper reinforcement is known with a closed cross-section structure configured by joining together an inside member and an outside member (see, for example, Japanese Patent Application Laid-Open (JP-A) No. 2001-199293, JP-A No. 6-135290, JP-A No. 2005-271734 and Japanese Utility Model Application Laid-Open No. 2-78451). In such bumper reinforcement structures, structures are known in which plural closed cross-sections are formed from top-to-bottom (see, for example, JP-A No. 2000-198401). Furthermore, in bumper reinforcement, technology is known wherein a web is made thicker on a compression flange side than on a tension flange side of a bending neutral axis of the web (see, for example, JP-A No. 11-59296).

DISCLOSURE OF INVENTION

Technical Problem

However, there is room for improvement in raising the bending strength of a bumper reinforcement without relying on increasing the thickness of members, namely increasing weight.

An object of the present invention is to obtain a bumper reinforcement structure capable of achieving a reduction in weight while still securing a required bending strength in a bumper reinforcement with a closed cross-section structure configured by joining together an inside member and an outside member.

Solution to Problem

A bumper reinforcement structure according to a first aspect of the present invention is formed with two or more closed cross-sections in a vehicle top-bottom direction by joining together an inside member and an outside member at three or more joint sections provided respectively separated from each other in the vehicle top-bottom direction. The inside member is disposed along a vehicle width direction at a vehicle front-rear direction end potion of the vehicle and supported by a framework member from the vehicle front-rear direction central side, and the outside member is disposed running along the vehicle width direction at the opposite side to the framework member with respect to the inside member. At least a portion of the joint sections is disposed at a same location in the vehicle front-rear direction as a wall portion configuring a vehicle front-rear direction front side or rear side of the closed cross-section, or disposed at a side away from the closed cross-section.

According to the above aspect, when load acts on the outside member towards a framework member side, bending occurs in the closed cross-section structure (bumper reinforcement) configured by the outside member and the inside member. Tension is induced by such bending at an inner side with respect to a centroid (neutral axis) of the closed cross-sections and compression is induced at an outer side with respect to the centroid.

The whole or a portion of the plural joint sections are disposed in the same position in the vehicle front-rear direction as a wall portion of the closed cross-sections or disposed at the side away from the closed cross-section (the centroid thereof). Namely, the joint sections that are overlapping plate portions are positioned as far away from the centroid of the closed cross-section as the wall portion configuring the closed cross-section or further away, and so these joint sections function as portions that bear a stress of tension or compression during bending. Namely, the joint sections can be efficiently utilized to resist bending and so the bending strength per unit weight is raised.

Therefore, in the bumper reinforcement structure according to the above aspect, a reduction in weight can be achieved while still securing the required bending strength for a bumper reinforcement with a closed cross-section structure configured by joining together an inside member and an outside member.

The above aspect may be configured with the plural joint sections disposed at the same location in the vehicle front-rear direction as a wall portion configured by the outside member within the wall portions configuring the vehicle front-rear direction front side and rear side of the closed cross-section, or disposed at the side away from the closed cross-section.

According to the above aspect, the bending strength per unit weight is further raised due to effectively utilizing plural joint sections as portions resisting bending.

A bumper reinforcement structure according to a second aspect of the present invention includes: an inside member disposed along a vehicle width direction at a vehicle front-rear direction end portion of a vehicle and supported from a vehicle front-rear direction central side by a framework member, the inside member being formed with plural indented portions provided between three or more joint sections separated from each other in the vehicle top-bottom direction and opening towards the opposite side to the framework member side; and an outside member being formed with three or more joint sections and a wall portion that configures a closed cross-section in combination with the indented portion, the three or more joint sections respectively joined to each of the inside member joint sections, and the three or more joint sections and at least a portion including both vehicle top-bottom direction end portions of the wall portion are disposed as each other on a same straight line in a cross-section orthogonal to a length direction of the closed cross-section.

According to the above aspect, when load acts on the outside member towards a framework member side, bending occurs in the bumper reinforcement of closed cross-section structure configured by the outside member and the inside member. Tension is induced by such bending at an inner side with respect to a centroid of the closed cross-section, and compression is induced at the outer side with respect to the centroid.

Each of the joint sections of the outside member are disposed on the same straight line in cross-section viewed from the side as at least a portion of the wall portions on the load input side of the closed cross-sections. Namely, each of the joint sections of the outside member is disposed in the same vehicle front-rear direction position as the wall portion on a compression side of the cross-section. Therefore the joint sections that are overlapping plate portions are disposed the same amount away from the closed cross-section centroid as the wall portion configuring the closed cross-section. Each of the three or more closed cross-sections accordingly functions as a portion that bears compressional stress during bending. Namely, each of the joint sections is effectively utilized as a portion that resists bending, and the bending strength per unit weight is raised.

Hence in the bumper reinforcement structure according to the above aspect, a reduction in weight can be achieved while still securing the required bending strength for a bumper reinforcement with the closed cross-section structure configured by joining together the inside member and the outside member.

The above aspect may be configured wherein a bead with length direction running along the vehicle width direction is formed to a wall portion configuring the outside member.

According to the above aspect, the bead is formed to the wall portion on the compression side during bending. The compression side of the bumper reinforcement with closed cross-section structure is accordingly reinforced against bending by the bead. Namely, localized buckling on the compression side of the bumper reinforcement is prevented or effectively suppressed.

The above aspect may be configured wherein the inside member is supported by the framework member at both the vehicle width direction end sides, and the bead is formed between locations of support by the framework member.

According to the above aspect, the bead is formed between supported points (fixing points) of the bumper reinforcement by the framework member, and so the compression side of the bumper reinforcement is reinforced against bending over a bead-formed range. Additionally, the beads are not provided at the vehicle width direction outside of the supported points and so a reduction in weight is achieved by, for example, configuring parts of the wall portions of the outside member to be flat.

The above aspect may be configured wherein: the joint sections positioned at both the vehicle top-bottom direction ends within the joint sections of the inside member and the outside member are disposed at same position in the vehicle front-rear direction as a wall portion of the outside member or disposed at a side away from the closed cross-section; the joint sections at both the vehicle top-bottom direction ends are joined at three or more joining locations separated from each other in the vehicle width direction; and non-continuous portions are provided at at least portions between the adjacent joint sections in the vehicle width direction of both the vehicle top-bottom direction ends at an inside member side or an outside member side.

According to the above aspect, the joint sections at both the top and bottom ends are disposed on a side where compression is induced during bending due to a load acting on the outside member. The non-continuous portions are provided at at least portions between adjacent joining points in the vehicle width direction at both the top and bottom ends of the inside or outside joint section. Hence the inside member and the outside member are prevented to be separated from each other and deformed in the front-rear direction at the portions between the joining points under compression, and splitting of the joining points of the inside member and the outside member accompanying such separation are suppressed.

The above aspect may be configured wherein vehicle width direction positions of the non-continuous portions are offset by the joint sections positioned at the vehicle top-bottom direction top end and the joint sections positioned at the vehicle top-bottom direction bottom end.

According to the above aspect, the non-continuous portions are disposed with being offset in the vehicle width direction between the joint sections at the top and bottom, and so rapid change in the section modulus (section force) to the above bending can be suppressed.

The above aspect may be configured wherein the non-continuous portions are formed at the joint section of the outside member so as to communicate the closed cross-section formed by the inside member and the outside member with a portion external to the closed cross-section.

According to the above aspect, the interior and exterior of the closed cross-section are placed in communication with each other through the non-continuous portions. Therefore, for example, coating liquid can thereby be caused to flow into the closed cross-section through the non-continuous portions when performing electrophoretic coating after joining together the inside member and the outside member.

Advantageous Effects of Invention

As explained above, the bumper reinforcement structure of the present invention exhibits the excellent effect of enabling a reduction in weight to be achieved while still securing the required bending strength for the bumper reinforcement of closed cross-section structure configured by joining together the inside member and the outside member.

BRIEF DESCRIPTION OF DRAWINGS

FIG. 2 is a perspective view of a schematic configuration of a front bumper according to the first exemplary embodiment of the present invention;

FIG. 3 is a diagram illustrating a schematic configuration of a front bumper according to the first exemplary embodiment of the present invention, shown in a cross-section taken on line 3-3 of FIG. 2;

FIG. 4 is a graph illustrating analysis results of bending moment occurring during a frontal collision of bumper reinforcement configuring a front bumper according to the first exemplary embodiment of the present invention, showing a comparison with a comparative example;

BEST MODE FOR CARRYING OUT THE INVENTION

Figure 1:
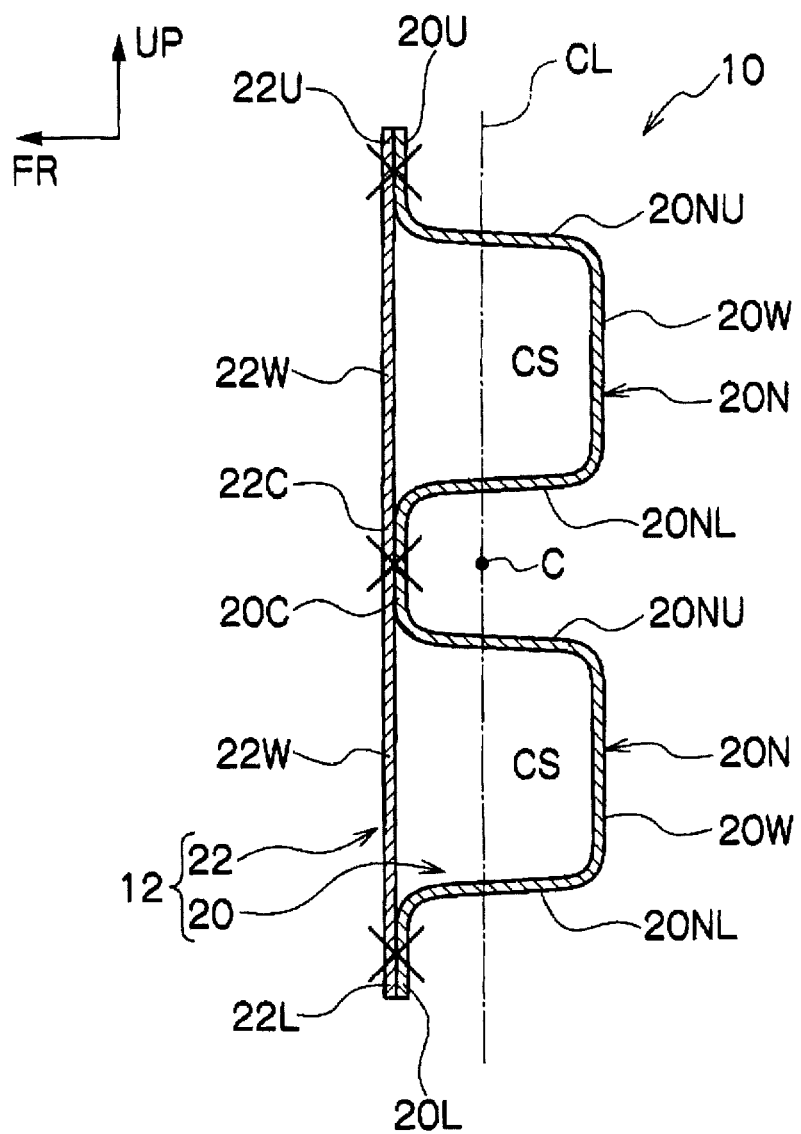
FIG. 1 is a diagram illustrating bumper reinforcement configuring a front bumper according to a first exemplary embodiment of the present invention, shown in a cross-section taken on line 1-1 of FIG. 2.

Explanation follows regarding a front bumper 10 to which a bumper reinforcement structure according to a first exemplary embodiment of the present invention has been applied, with reference to FIG. 1 to FIG. 5. Note that in the drawings an arrow FR indicates a vehicle front-rear direction front direction, an arrow UP indicates a vehicle top-bottom direction top direction, an arrow IN indicates a vehicle width direction inside, and an arrow OUT indicates the vehicle width direction outside, as appropriate.

FIG. 2 is a perspective view of main relevant portions of the front bumper 10. FIG. 3 is a cross-section taken along line 3-3 in FIG. 2. As shown in FIG. 2 and FIG. 3, the front bumper 10 includes bumper reinforcement 12 that serves as a framework member. The bumper reinforcement 12 configures a front bumper that is covered from the vehicle front by a bumper cover 14, not shown in FIG. 2.

The bumper reinforcement 12 is supported in the vicinity of both the vehicle width direction ends by front side members 16 that configure a left and right pair of vehicle body framework sections. In the present exemplary embodiment, the bumper reinforcement 12 has angled portions 12B configured by portions positioned to the width direction outsides of bent portions or curved portions 12A that curve around towards the vehicle rear in the vicinity of both the vehicle width direction ends of the bumper reinforcement 12. The pair of front side members 16 is coupled to the angled portions 12B through crush boxes 18 positioned on the same respective sides from the vehicle width direction center. Note that the bumper reinforcement 12 may be formed curved in an overall arc shape in plan view.

Accordingly a configuration is achieved such that when a rearward load from the vehicle front acts on the bumper reinforcement 12 between support (fixing) points of the front side members 16, bending occurs in the bumper reinforcement 12 so as to move a load input point towards the rear. Consequently, accompanying such bending, tension is imparted to vehicle rear side of the bumper reinforcement 12 from the centroid C in the drawings (neutral axis CL, see FIG. 1) and compression is imparted to vehicle front side of the bumper reinforcement 12 from the centroid C.

As shown in FIG. 1, the bumper reinforcement 12 employs a two member configuration formed by joining together an inner panel 20 serving as an inside member and an outer panel 22 serving as an outside member. The inner panel 20 includes an upper flange 20U, a lower flange 20L, and a center flange 20C, each respectively serving as joint sections. Indented portions 20N with U-shaped cross-sections opening towards the vehicle front are formed respectively between the upper flange 20U and the center flange 20C and between the center flange 20C and the lower flange 20L.

Namely, the inner panel 20 is configured as if two members with hat shaped cross-sections had been connected together one on top of the other. In other words, configuration is such that the upper flange 20U, the lower flange 20L and the center flange 20C are positioned at the foremost portion of the inner panel 20 for each portion (cross-section) in the vehicle width direction of the inner panel 20. In the present exemplary embodiment, the upper flange 20U, the lower flange 20L and the center flange 20C are disposed on the same straight line in cross-section as viewed from the side. Namely, the upper flange 20U, the lower flange 20L and the center flange 20C are formed along a same flat plane in a straight section 12C of the bumper reinforcement 12 positioned between left and right curved portions 12A.

The outer panel 22 includes an upper flange 22U joined to the upper flange 20U, a lower flange 22L joined to the lower flange 20L, and a center flange 22C joined to the center flange 20C. Wall portions 22W between the upper flange 22U and the center flange 22C and between the center flange 22C and the lower flange 22L configure closed cross-sections CS, in combination with the respective indented portions 20N. In the present exemplary embodiment, the wall portions 22W are disposed along the open faces of the indented portions 20N, and close off the openings of the indented portions 20N. The outer panel 22 is accordingly configured with the upper flange 22U, the center flange 22C, the lower flange 22L and the top and bottom wall portions 22W disposed on a same straight line running along the vertical direction in cross-section as viewed from a side of the vehicle. In the present exemplary embodiment, the outer panel 22 is configured with a flat plate shape without front-rear undulations in cross-section as viewed from the side of the vehicle.

The bumper reinforcement 12 is configured by respectively joining together the upper flange 20U and the upper flange 22U, the lower flange 20L and the lower flange 22L and the center flange 20C and the center flange 22C by spot welding. The locations marked with "x" in FIG. 1 indicate the locations where spot welds have been made.

As described above, the joint sections of the bumper reinforcement 12 between the inner panel 20 and the outer panel 22 are disposed at the foremost portion of the bumper reinforcement 12 in each of the cross-sections of the bumper reinforcement 12 taken at locations along the vehicle width direction. Namely, in the bumper reinforcement 12, the joint sections between the inner panel 20 and the outer panel 22 are disposed at positions separated the furthest towards the vehicle front from the neutral axis CL (the vertical line passing through centroid C in the drawings) of the bumper reinforcement 12 as illustrated in FIG. 1.

As shown in FIG. 2 and FIG. 3, tool holes (fastening operation holes) 22A are formed in portions of the wall portions 22W of the outer panel 22 configuring the angled portions 12B. As shown in FIG. 3, bolt holes 20A are formed in wall portions 20W of the inner panel 20 facing towards the wall portions 22W. The angled portions 12B are fixed to the crush boxes 18 by inserting bolts 26 through the tool holes 22A into the closed cross-sections CS and through the bolt holes 20A, and then screwing the bolts 26 into weld nuts 24 on the crush boxes 18 side.

Explanation follows regarding operation of the present exemplary embodiment.

In the front bumper 10 configured as described above, when a frontal collision occurs in the vehicle applied with the front bumper 10, collision load is input to the bumper reinforcement 12 between the locations of support by the front side members 16. Bending is accordingly induced in the bumper reinforcement 12 such that the collision location moves relatively towards the vehicle rear.

Accompanying such bending, tensile stress acts on portions of the bumper reinforcement 12 at the vehicle rear side of the neutral axis CL (portions including the wall portions 20W). However, compressional stress acts on the portions of the bumper reinforcement 12 further towards the vehicle front side than the neutral axis CL. Namely, in the front bumper 10, compressional stress acts not only the wall portions 22W of the bumper reinforcement 12, but also on the upper flanges 20U, 22U, the center flanges 20C, 22C and the lower flanges 20L, 22L that have been joined to each other.

Figure 23:
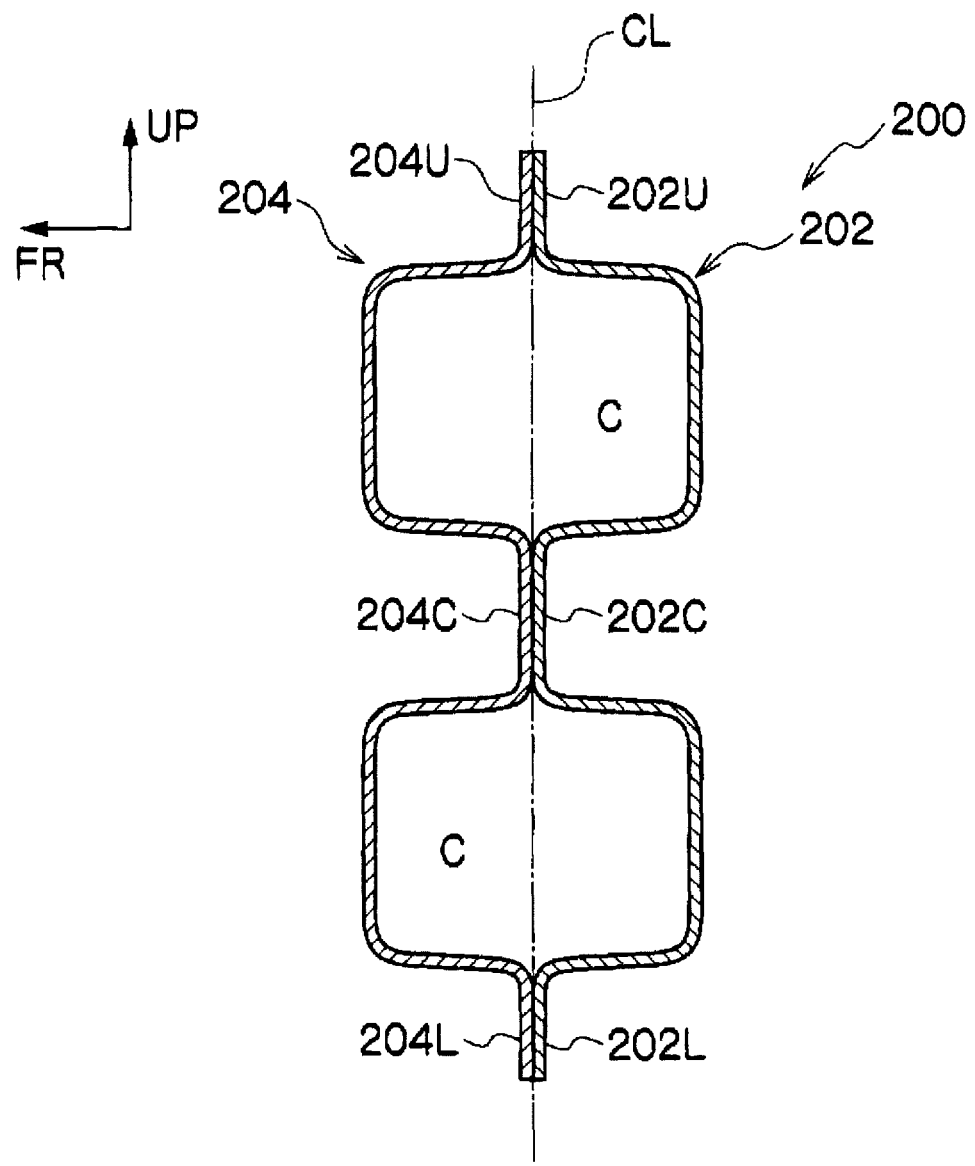
FIG. 23 is a cross-section illustrating bumper reinforcement according to a first comparative example to an exemplary embodiment of the present invention.

For example, in a bumper reinforcement 200 according to a first comparative example shown in FIG. 23, an upper flange 202U, a center flange 202C and a lower flange 202L of an inner panel 202 are joined along a neutral axis CL to an upper flange 204U, a center flange 204C, and a lower flange 204L of an outer panel 204. Such a structure achieves a higher bending strength (induced bending moment) for unit weight compared to bumper reinforcement with a single closed cross-section CS formed by joining together respective hat shaped cross-sections of an inner panel and an outer panel. However, in the bumper reinforcement 200 according to the comparative example, bending load (high stress acting during bending) is not borne by the upper flanges 202U, 204U, the center flanges 202C, 204C and the lower flanges 202L, 204L. It cannot therefore be said that the weight of the upper flanges 202U, 204U, the center flanges 202C, 204C and the lower flanges 202L, 204L is being efficiently utilized.

In contrast thereto, as stated above, in the front bumper 10 the upper flanges 20U, 22U, the center flanges 20C, 22C and the lower flanges 20L, 22L of the bumper reinforcement 12 bear compression load. The bending strength per unit weight of the bumper reinforcement 12 is accordingly increased in comparison to the bumper reinforcement 200 of the comparative example. In particular, compressional stress is borne by the plural joint sections of the upper flanges 20U, 22U, the center flanges 20C, 22C and the lower flanges 20L, 22L at locations of the bumper reinforcement 12 separated furthest from the neutral axis CL. Therefore the bending strength per unit weight of the bumper reinforcement 12 can be increased even in comparison to a configuration in which compressional stress is borne by a portion of the upper flanges 20U, 22U, the center flanges 20C, 22C and the lower flanges 20L, 22L positioned separated furthest from the neutral axis CL.

Figure 24:
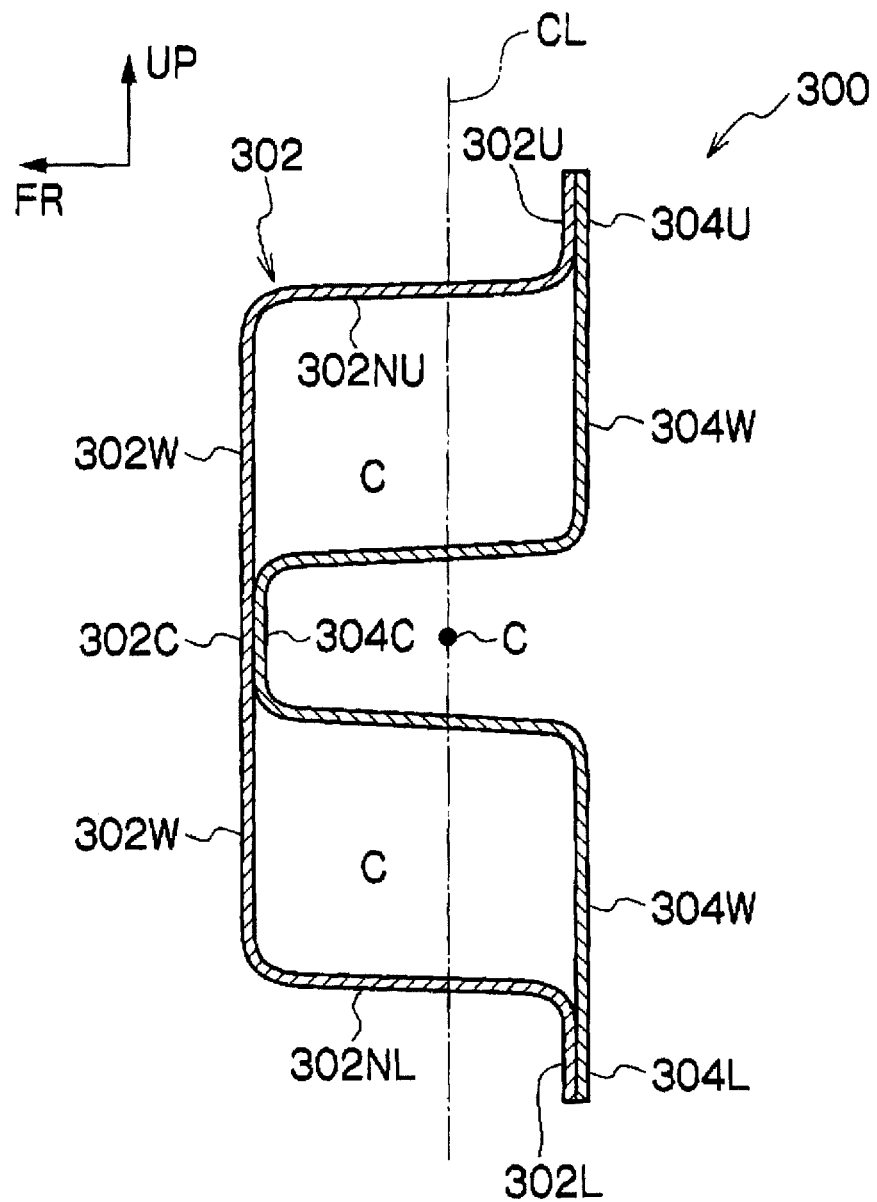
FIG. 24 is a cross-section illustrating bumper reinforcement according to a second comparative example to an exemplary embodiment of the present invention.

In the front bumper 10, the upper flanges 20U, 22U, the center flanges 20C, 22C and the lower flanges 20L, 22L are disposed on the front side (the vehicle outside) which is the side to which load is input. The ability to carry load (bending strength) of the bumper reinforcement 12 is therefore raised. This point will now be explained in a comparison to bumper reinforcement 300 according to a second comparative example as shown in FIG. 24 that is included in the present invention.

First, supplementary explanation will be given regarding the bumper reinforcement 300. The bumper reinforcement 300 is equipped with an outer panel 302 with a hat shaped cross-section opening towards the vehicle rear. The outer panel 302 includes an upper flange 302U, a center flange 302C and a lower flange 302L. The center flange 302C is formed between top and bottom wall portions 302W forming the front wall of closed cross-sections CS and in the same flat plane as the wall portions 302W. The bumper reinforcement 300 is equipped with an inner panel 304 formed with a hat shaped cross-section opening towards the vehicle rear with a small width opening. The inner panel 304 includes an upper flange 304U, a center flange 304C and a lower flange 304L. The upper and lower flanges 304U, 304L are formed in the same flat plane as the upper and lower wall portions 304W that configure the rear wall of the closed cross-sections CS. The bumper reinforcement 300 is configured by joining the upper flange 302U, the center flange 302C and the lower flange 302L to the upper flange 304U, the center flange 304C and the lower flange 304L by spot welding. In the bumper reinforcement 300, the center flanges 302C, 304C are positioned at the front side of the neutral axis CL (the load input side), and the upper and lower flanges 302U, 304U, 302L, 304L are positioned at the rear side of the neutral axis CL.

In the bumper reinforcement 300, bending occurs when collision load is input during a frontal collision, with tensile stress acting on the bumper reinforcement 300 to the rear side of the neutral axis CL, and with compressional stress acting to the front side of the neutral axis CL. The top and bottom of the closed cross-sections CS are configured by an upper wall 302NU and a lower wall 302NL.

Figure 5A:
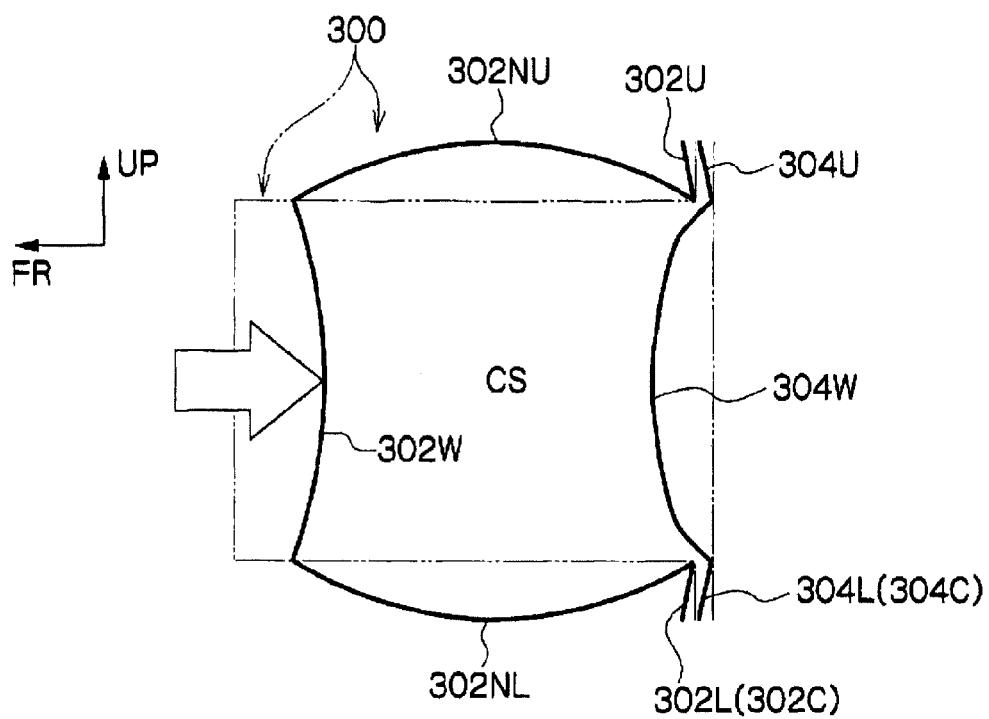
FIG. 5A is a cross-section illustrating a deformation mode in an analysis model of bumper reinforcement according to a comparative example to an exemplary embodiment of the present invention.

The deformation mode of the bumper reinforcement 300 (in an analysis model simplified to a single closed cross-section) is as shown in FIG. 5A. The upper wall 302NU and the lower wall 302NL configuring the closed cross-section can be modeled as beams under axial compression. In the bumper reinforcement 300 not having flanges on the compression side (the collision load input side), the deformation mode of the upper wall 302NU and the lower wall 302NL is a deformation mode with a single bowing-deflection peak. A buckling load F can be expressed as:

$$F = n^2 \pi^2 EI/L^2$$

wherein n is the order of deformation modes based on the constraining conditions of the front and rear ends, E is the longitudinal elasticity modulus (Young's modulus), I is the cross-section second order moment, and L is the front-rear length of the upper wall 302NU and the lower wall 302NL. In this case, since n=1, the buckling load $F_{300}$ of the upper wall 304NU and the lower wall 302NL is:

$$F_{300} = \pi^2 EI/L^2$$

This expression is similar in a case, for example, in which configuration is made by front-rear reversal of the bumper reinforcement 12 as a comparative example (an example included in the present invention).

Figure 5B:
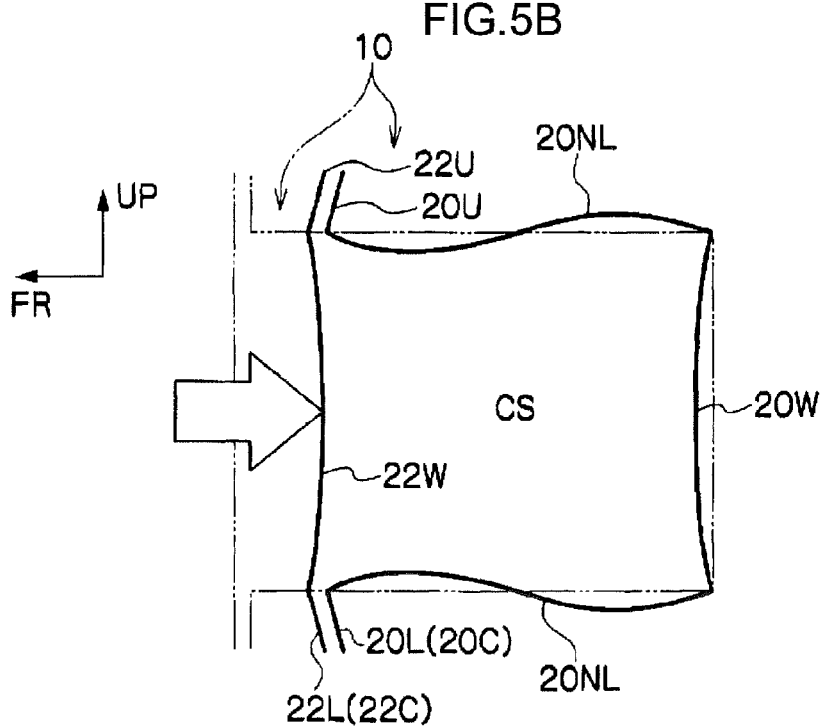
FIG. 5B is a cross-section illustrating a deformation mode in an analysis model of bumper reinforcement according to a first exemplary embodiment of the present invention.

In contrast thereto, the bumper reinforcement 12 with flanges disposed at the load input side (in an analysis model simplified to a single closed cross-section) has a deformation mode of the upper wall 20NU and the lower wall 20NL configuring the closed cross-section CS as shown in FIG. 5B. Namely, the upper wall 20NU and the 20NL are under compression along the vehicle front-rear direction and deform in a substantially S-shape as viewed from the side. Namely, a deformation mode is induced in which rotation at the front ends of the upper wall 20NU and the lower wall 20NL is suppressed by the upper flange 22U, the center flange 20C, and the lower flange 20L of the bumper reinforcement 12, and in such cases n=2.

Consequently, the buckling load $F_{12}$ of the bumper reinforcement 12 is given by:

$$F_{12} = 4\pi^2 EI/L^2$$

and a high load can be maintained even after the peak load has been generated.

FIG. 4 illustrates the relationship between the bending moment occurring (bending strength) against stroke in the bumper reinforcements 12 and 300. It can be seen from FIG. 4 that although the peak load occurring in the bumper reinforcement 12 is of the same order as that of the bumper reinforcement 300 according to the comparative example of FIG. 5A, it can be seen that the load occurring when the stroke is increased is higher than for the bumper reinforcement 300. Namely, in the front bumper 10, the maintainability of load occurring accompanying bending of the bumper reinforcement 12 can be raised.

Other Exemplary Embodiments

Explanation now follows regarding other exemplary embodiments of the present invention. Note that components and sections that are fundamentally the same as those of the first exemplary embodiment or previously referred to configurations are allocated the same reference numerals to those of the first exemplary embodiment or previously referred to configurations, and further explanation thereof is omitted. In each of the exemplary embodiments the shape of the bumper reinforcement in plan view is similar to the shape of the plan view of the bumper reinforcement 12, and further explanation thereof is omitted.

Second Exemplary Embodiment

Figure 6:
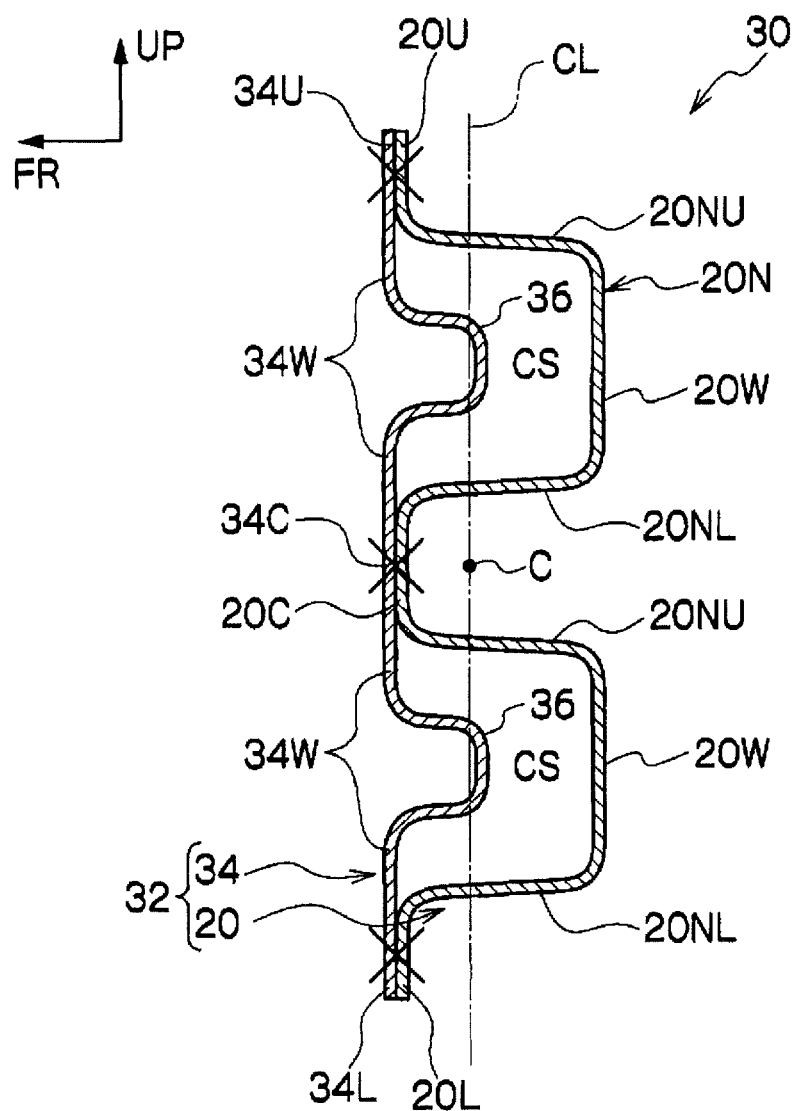
FIG. 6 is a diagram illustrating bumper reinforcement configuring a front bumper according to a second exemplary embodiment of the present invention, shown in a cross-section taken on line 6-6 of FIG. 7.
Figure 7:
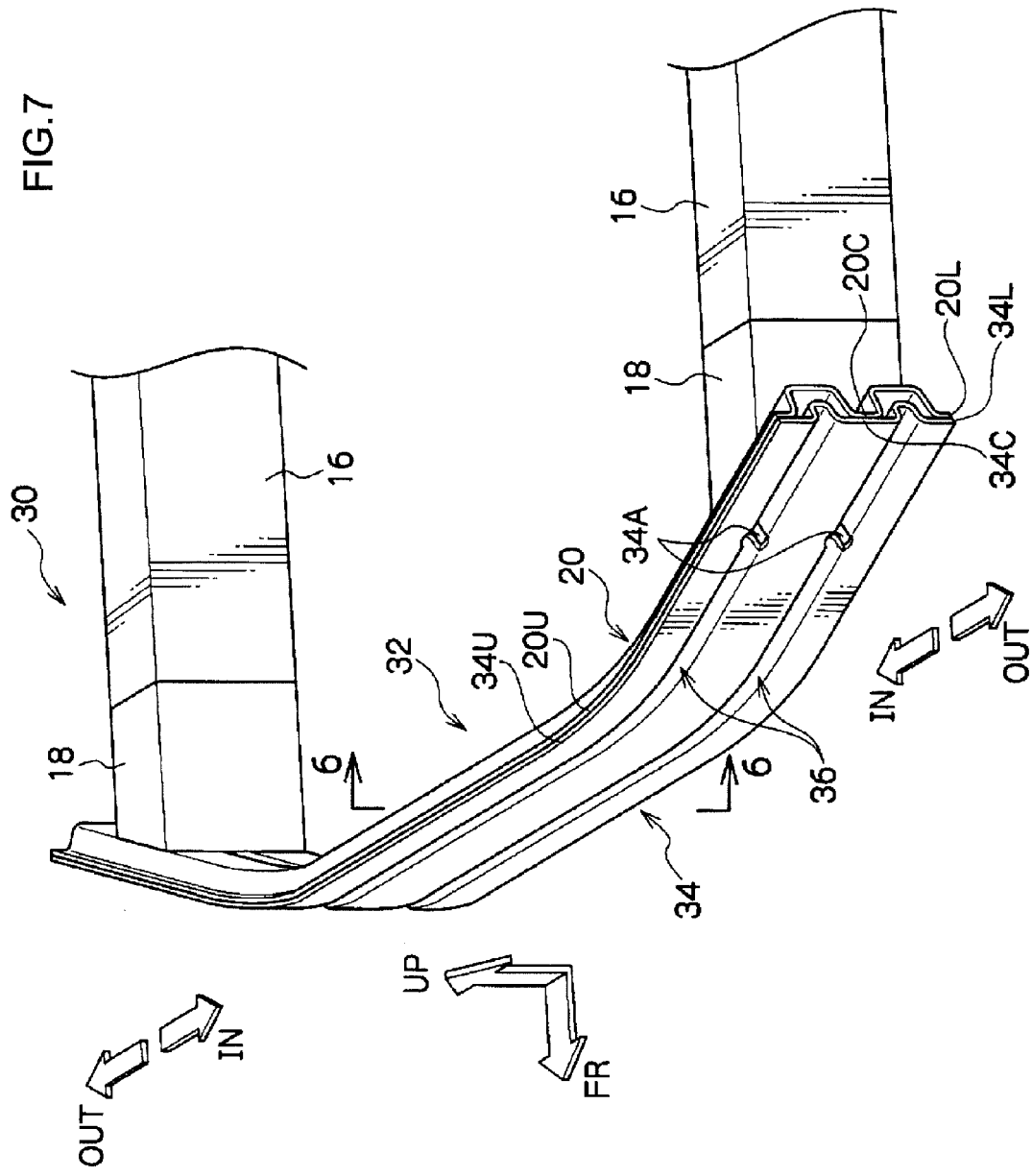
FIG. 7 is a perspective view of a schematic configuration of a front bumper according to the second exemplary embodiment of the present invention.

FIG. 6 illustrates bumper reinforcement 32 configuring a front bumper 30 according to a second exemplary embodiment of the present invention, in a cross-section corresponding to FIG. 1. FIG. 7 illustrates the front bumper 30 in a perspective view corresponding to FIG. 2. As shown in FIG. 6 and FIG. 7, the front bumper 30 is equipped with an outer panel 34 formed with beads 36 on wall portions 34W in place of the outer panel 22 with the flat wall portions 22W.

The outer panel 34 is formed with the respective wall portions 34W between an upper flange 34U, a center flange 34C and a lower flange 34L. The upper flange 34U, the center flange 34C and the lower flange 34L are joined to the upper flange 20U the center flange 20C and the lower flange 20L by spot welding. The beads 36 are formed with length direction along the vehicle width direction at top-bottom direction intermediate portions of the respective wall portions 34W. In the present exemplary embodiment, the beads 36 are formed spanning the entire length of the bumper reinforcement 32. In the present exemplary embodiment the beads 36 are also formed so as to project out inside of the closed cross-sections CS configured by the wall portions 34W and the indented portions 20N.

In cross-section viewed from the side, both the top-bottom end portions of the wall portions 34W, excluding portions at locations where the beads 36 are formed, are disposed on the same straight line as the upper flange 34U, the center flange 34C and the lower flange 34L (extending along the same flat plane). Tool holes 34A of the outer panel 34 are formed piercing through the upper and lower beads 36. The configuration of other portions of the front bumper 30, including non-illustrated portions, is similar to corresponding portions of the front bumper 10.

Consequently, fundamentally similar operation enables fundamentally similar advantageous effects to also be obtained by the front bumper 30 according to the second exemplary embodiment to those of the front bumper 10 according to the first exemplary embodiment. In the front bumper 30, the beads 36 are formed on the side where compressional stress acts accompanying bending in the bumper reinforcement 32. Local buckling at the portions on the compression side of the bumper reinforcement 32 can accordingly be effectively suppressed. Namely, the bending moment (bending strength) that occurs can be efficiently raised by forming the beads 36.

Figure 8:
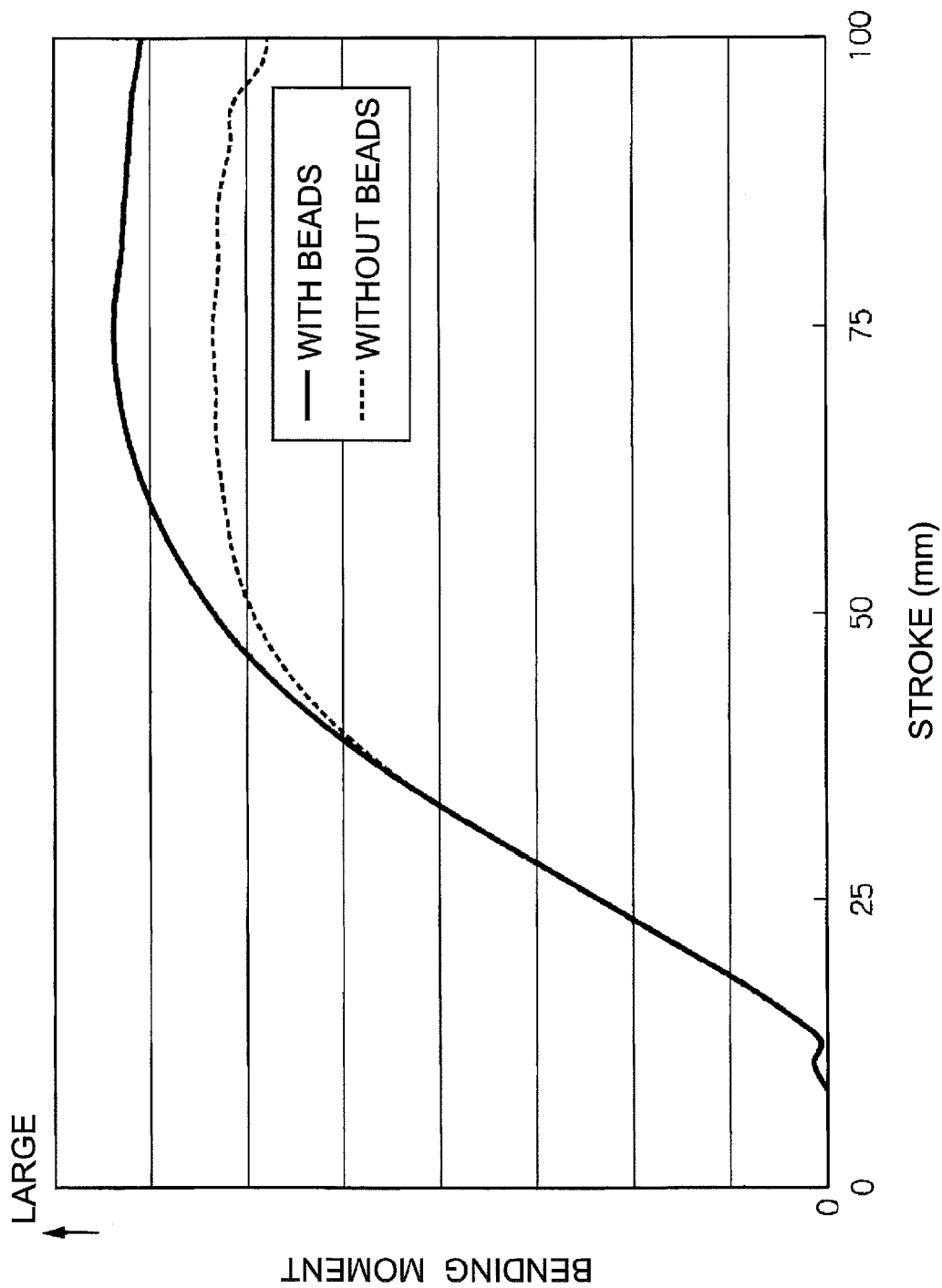
FIG. 8 is a graph illustrating results of three point bending analysis for bumper reinforcement configuring a front bumper according to the second exemplary embodiment of the present invention, showing a comparison with the first exemplary embodiment.

FIG. 8 illustrates results of 3-point bending analysis of the bumper reinforcement 32 including the beads 36 and the bumper reinforcement 12 that is not provided with the beads 36. It can be seen from FIG. 8 that the bumper reinforcement 32 of the front bumper 30 can raise the bending moment that occurs, namely the bending strength, compared to the bumper reinforcement 12.

Third Exemplary Embodiment

Figure 9:
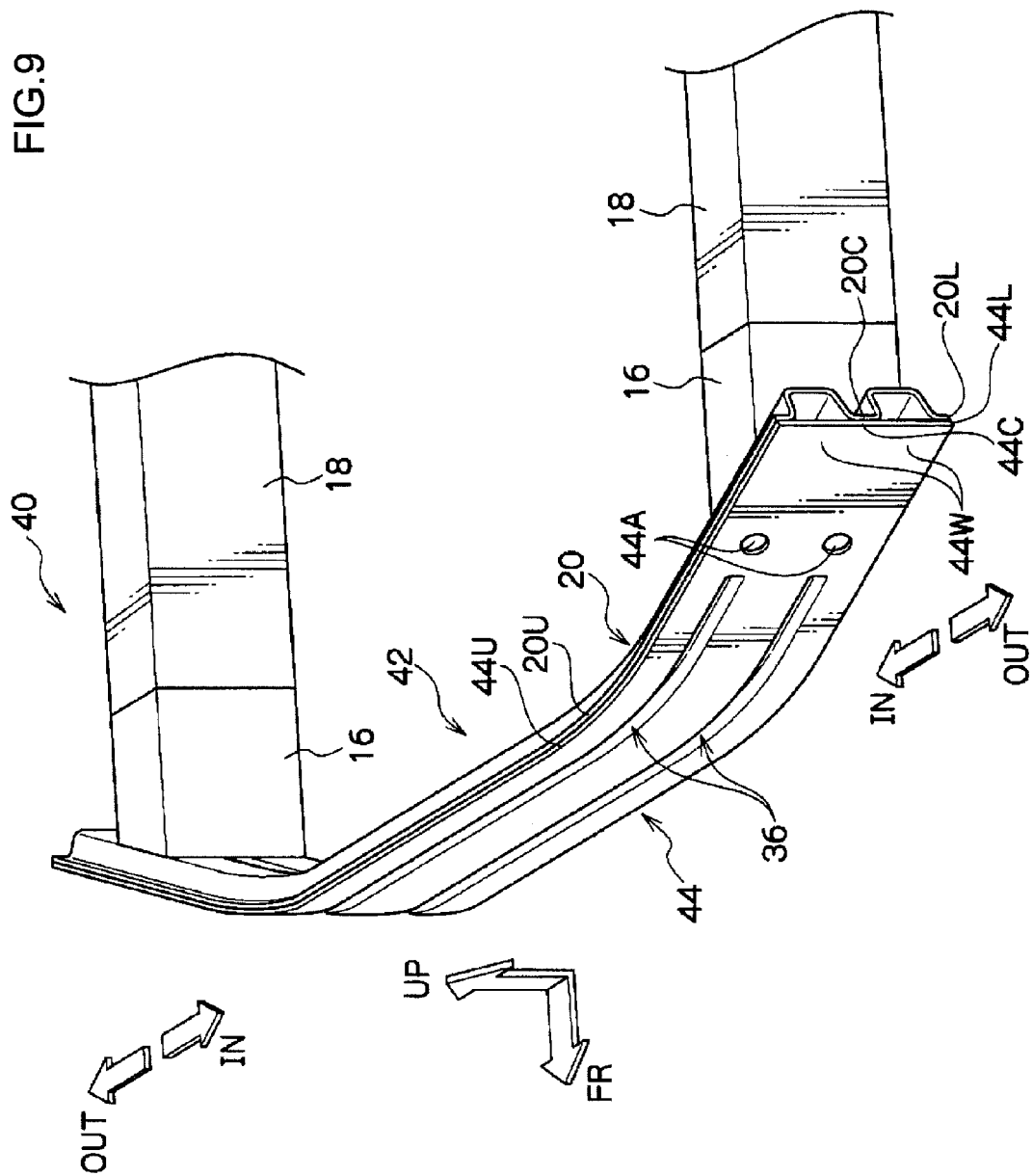
FIG. 9 is a perspective view illustrating a schematic configuration of a front bumper according to a third exemplary embodiment of the present invention.
Figure 10:
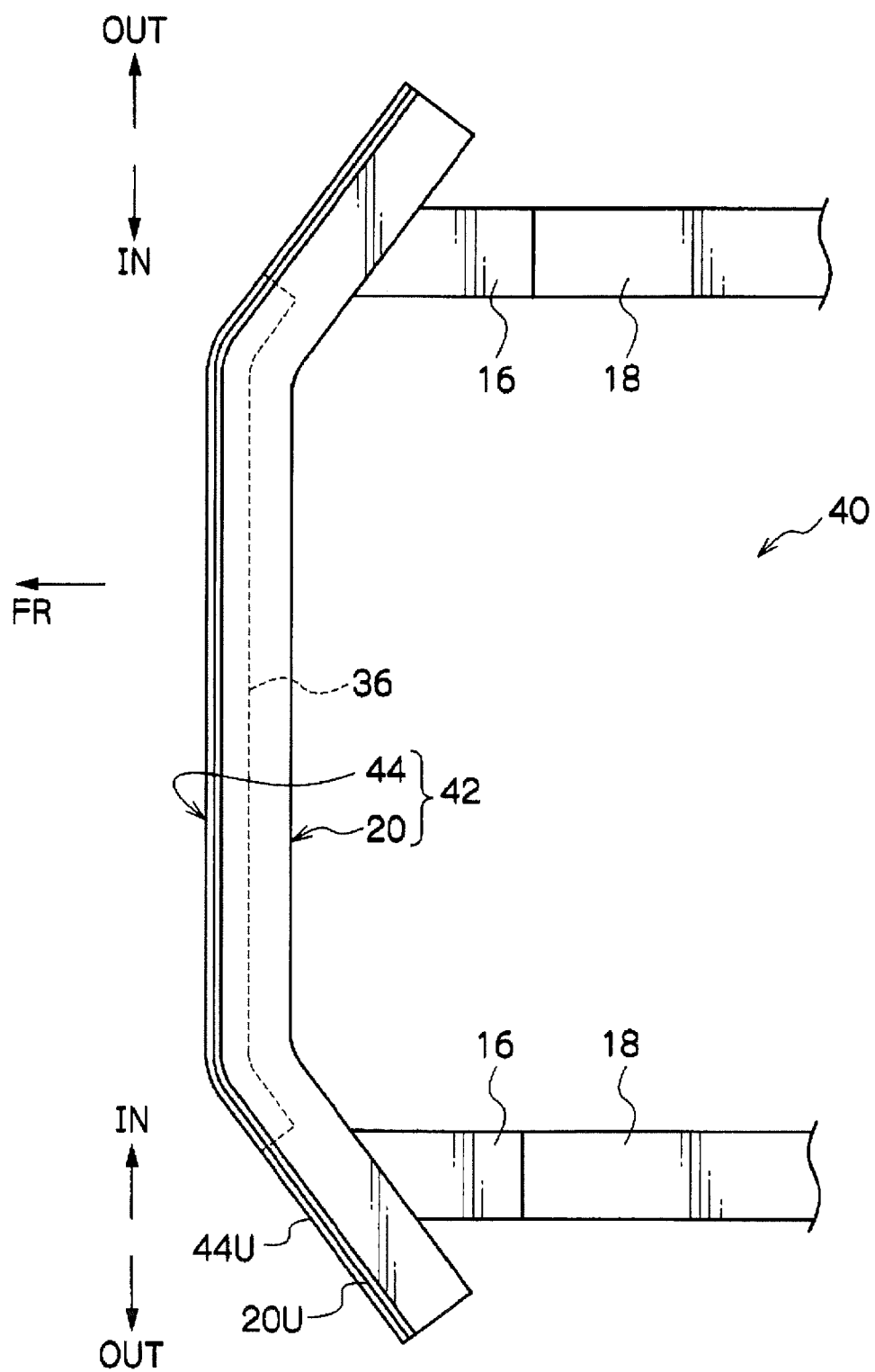
FIG. 10 is a plan view illustrating a schematic configuration of a front bumper according to the third exemplary embodiment of the present invention.

FIG. 9 illustrates bumper reinforcement 42 configuring a front bumper 40 according to a third exemplary embodiment of the present invention, in a perspective view corresponding to FIG. 7. FIG. 10 illustrates a plan view of the bumper reinforcement 42. As shown in FIG. 9 and FIG. 10, the front bumper 40 differs from the front bumper 30 of the second exemplary embodiment in the range over which the beads 36 are formed.

The bumper reinforcement 42 is equipped with an outer panel 44 in place of the outer panel 34. The outer panel 44 is formed with respective wall portions 44W between an upper flange 44U, a center flange 44C and a lower flange 44L. The upper flange 44U, the center flange 44C and the lower flange 44L are joined by spot welding to the upper flange 20U, the center flange 20C and the lower flange 20L.

In the bumper reinforcement 42, the beads 36 are formed only along the length direction of the bumper reinforcement 42 between the coupling locations to the crush boxes 18 (the front side members 16). Consequently, the outer panel 44 configuring the bumper reinforcement 42 in combination with the inner panel 20 has tool holes 44A that are formed at positions not formed with the beads 36. Other portions of the configuration of the outer panel 44, including non-illustrated portions, are configured similarly to corresponding portions of the front bumper 30.

Consequently, fundamentally similar operation enables fundamentally similar advantageous effects to also be obtained by the front bumper 40 according to the third exemplary embodiment to those of the front bumper 30 according to the second exemplary embodiment. In the front bumper 40, the beads 36 are not formed at either of the length direction end portions in the bumper reinforcement 42. A reduction in weight can accordingly be achieved with the bumper reinforcement 42 compared to the bumper reinforcement 32, while still securing equivalent bending strength to that of the bumper reinforcement 32.

In the front bumper 40, the tool holes 44A are disposed at portions of the outer panel 44 where the beads 36 are not formed (at substantially flat portions). The tool holes 44A can accordingly be formed with a simple process. The tool holes 44A can also be formed with high precision.

Figure 11A:
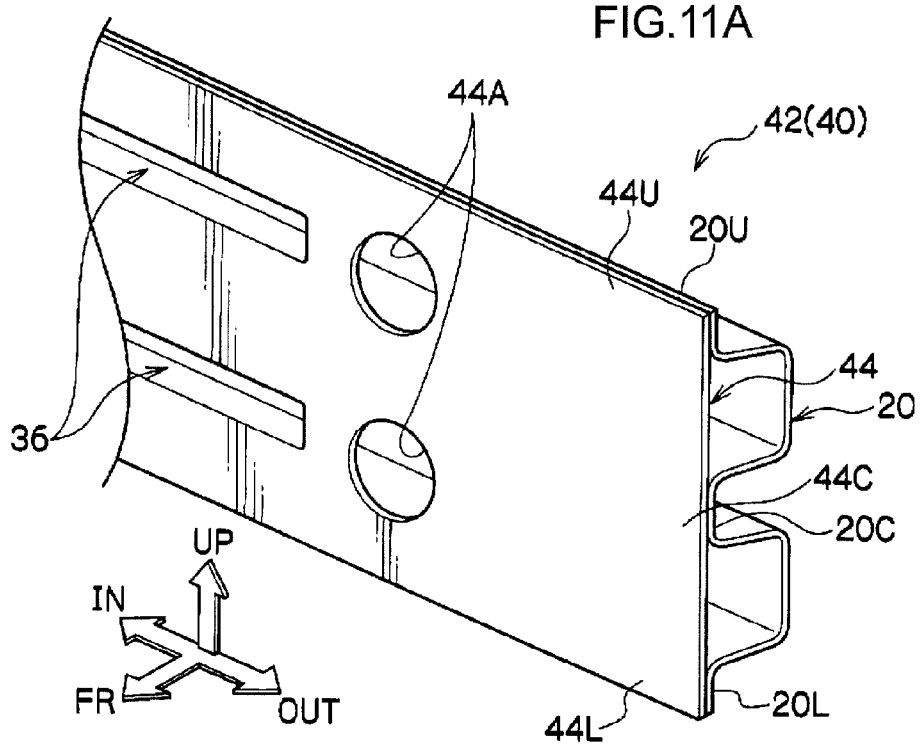
FIG. 11A is an enlarged perspective view of an end portion of bumper reinforcement according to the third exemplary embodiment of the present invention.
Figure 11B:
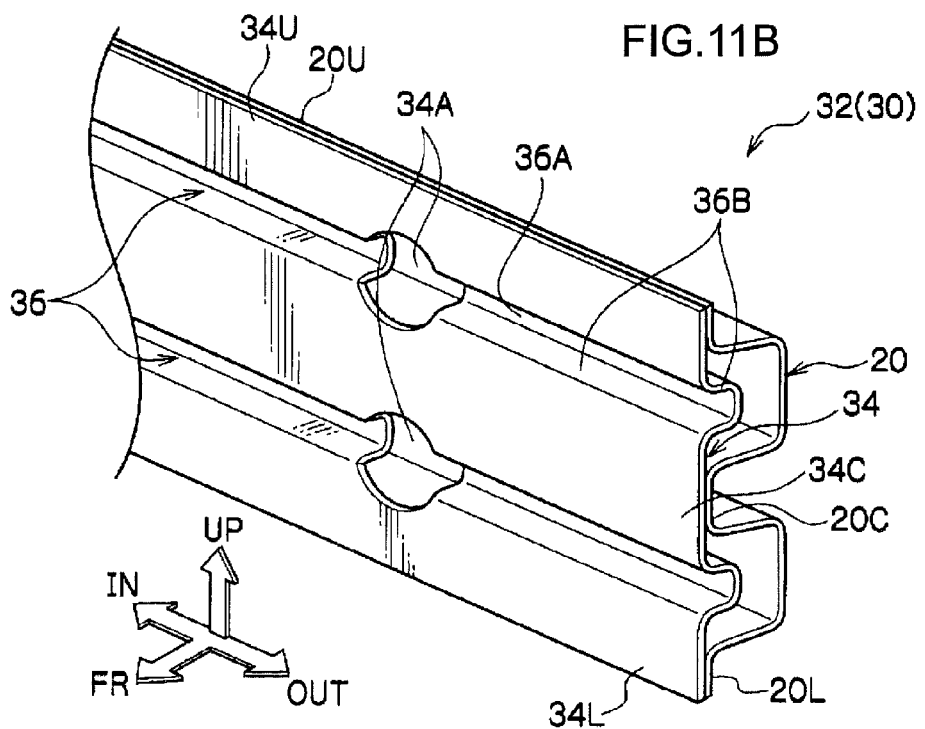
FIG. 11B is an enlarged perspective view of an end portion of bumper reinforcement according to the second exemplary embodiment of the present invention, for comparison with FIG. 11A.

Namely, as shown in FIG. 11B, the tool holes 34A of the outer panel 34 are formed by cutting out an indentation-bottom wall 36A and top and bottom groove walls 36B of the beads 36. This makes the hole forming process difficult, and makes it difficult to achieve precise processing. In contrast thereto, the tool holes 44A are formed by cutting out substantially flat portions of the outer panel 44, as shown in FIG. 11A. This makes processing easy, and enables forming with a high precision for placement and dimensions to be achieved.

Fourth Exemplary Embodiment

Figure 12:
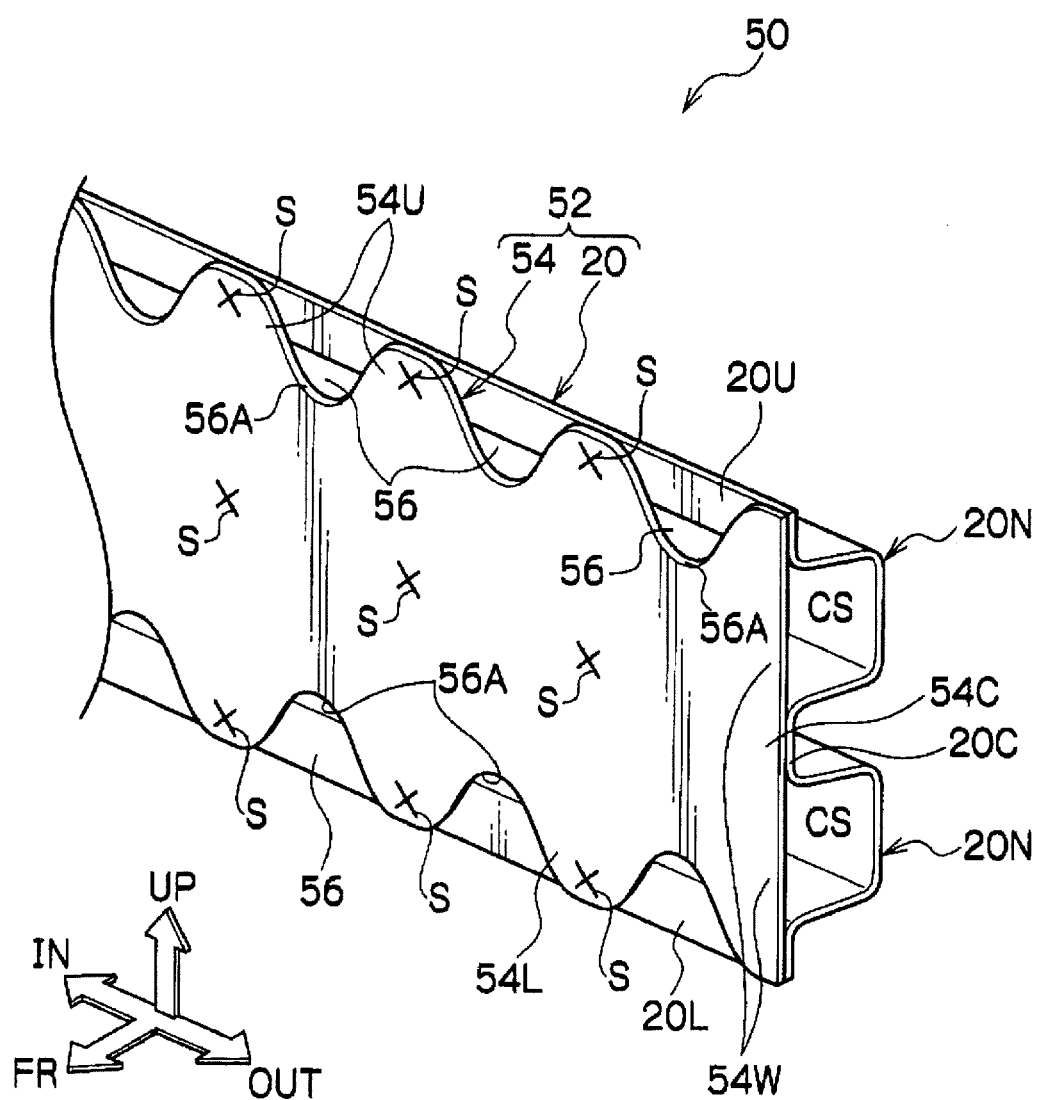
FIG. 12 is an enlarged perspective view of an end portion of bumper reinforcement according to a fourth exemplary embodiment of the present invention.

FIG. 12 illustrates a perspective view of a portion of bumper reinforcement 52 configuring a front bumper 50 according to a fourth exemplary embodiment of the present invention. As shown in FIG. 12, the front bumper 50 has upper and lower flanges 54U, 54L of an outer panel 54 configuring the bumper reinforcement 52 in combination with an inner panel 20. The upper and lower flanges 54U, 54L are discontinuous along the vehicle width direction.

The outer panel 54 is formed with respective wall portions 54W between an upper flange 54U, a center flange 54C and a lower flange 54L. The upper flange 54U, the center flange 54C and the lower flange 54L are joined to an upper flange 20U, a center flange 20C and a lower flange 20L by spot welding.

Cutout portions 56 serving as non-continuous portions are formed in the upper and lower flanges 54U, 54L of the outer panel 54 at portions between the spot welding points S to the flanges 20U, 20L. In the present exemplary embodiment, the cutout portions 56 reach as far as wall portions 54W configuring the closed cross-sections CS in combination with the indented portions 20N. Hence, in the bumper reinforcement 52, the closed cross-sections CS are placed in communication with external portions at the cutout portions 56 (at portions on the side of bottom portions 56A). Each of the cutout portions 56 is configured such that at least the bottom portions 56A have smoothly curving faces.

The center flange 54C formed between the upper and lower wall portions 54W is joined by spot welding to the center flange 20C. Other portions of the configuration of the front bumper 50, including non-illustrated portions, are similar to corresponding portions of the front bumper 10.

Consequently, fundamentally similar operation enables fundamentally similar advantageous effects to also be obtained by the front bumper 50 according to the fourth exemplary embodiment to those of the front bumper 10 according to the first exemplary embodiment. Moreover, in the front bumper 50, the cutout portions 56 are formed in the upper flange 54U and the lower flange 54L where compressional stress acts during bending of the bumper reinforcement 52. This accordingly makes splitting of the spot welds between the upper flange 20U and the upper flange 54U and between the lower flange 20L and the lower flange 54L less liable to occur.

Figure 13A:
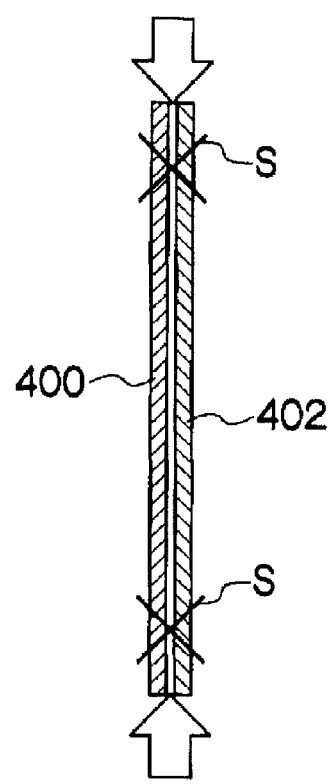
FIG. 13A is a schematic diagram illustrating action of a compression load between spot welding points of flanges during flange bending.
Figure 13B:
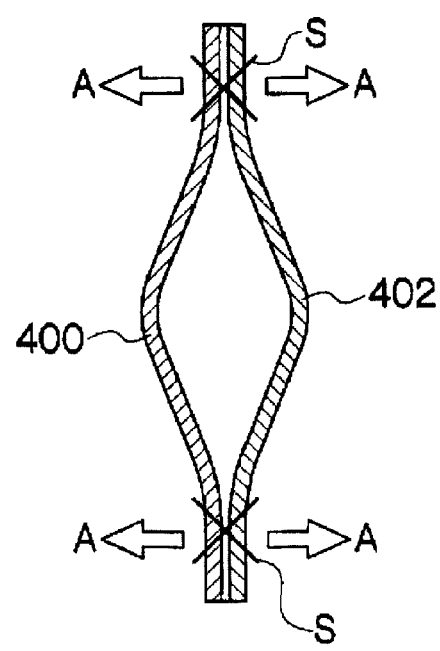
FIG. 13B is a schematic diagram illustrating a buckled state between spot welding points of flanges during flange bending.

Supplementary explanation follows regarding this point, with reference to FIG. 13. When two panels 400, 402 are joined together by spot welding as shown in FIG. 13A, the panels 400, 402 buckle between the spot welding points S when the panels 400, 402 are compressed. When the panels 400, 402 deform by buckling in the direction to separate from each other, as shown in FIG. 13B, load acts on the spot welding points S in the splitting direction as indicated by arrows A. In such cases there is a possibility of the spot welding points S splitting. For bumper reinforcements it is therefore necessary to take countermeasures such as providing many spot welding points S.

However, load does not readily act on the spot welding points S in the splitting direction for the bumper reinforcement 52 that is provided with the cutout portions 56 between the spot welding points S in the upper flange 54U and the lower flange 54L. Consequently, in the front bumper 50 the spot welding points S of the bumper reinforcement 52 can be prevented or effectively suppressed from splitting.

In the front bumper 50, when performing antirust coating employing an electrophoretic coating method, the cutout portions 56 that communicate the closed cross-sections CS to the outside can be used to function as through-flow holes for the through flow of Electro-Deposition liquid (ED liquid) (referred to below as ED holes). When dedicated ED holes are provided in the bumper reinforcement 52, then such ED holes are preferably formed in the upper wall 20NU and the lower wall 20NL of the inner panel 20 from perspectives other than strength constraints. However, when the inner panel 20 is manufactured by hot press electrical heating, it is not preferable to form the ED holes in the upper wall 20NU and the lower wall 20NL from the perspective of preventing uneven heating. Moreover, when hole opening processing is performed after press forming when the temperature has dropped, there is the possibility of delayed fracturing occurring and so this is also not preferable. It accordingly becomes difficult to satisfy required strength conditions while the ED holes are provided to allow sufficient ED liquid to flow into the closed cross-sections CS (processing conditions).

In this respect the front bumper 50 is formed with the ED holes by providing the cutout portions 56 in the outer panel 54. Thus provision of ED holes (processing conditions) and desired strength conditions can both be satisfied.

Fifth Exemplary Embodiment

Figure 14:
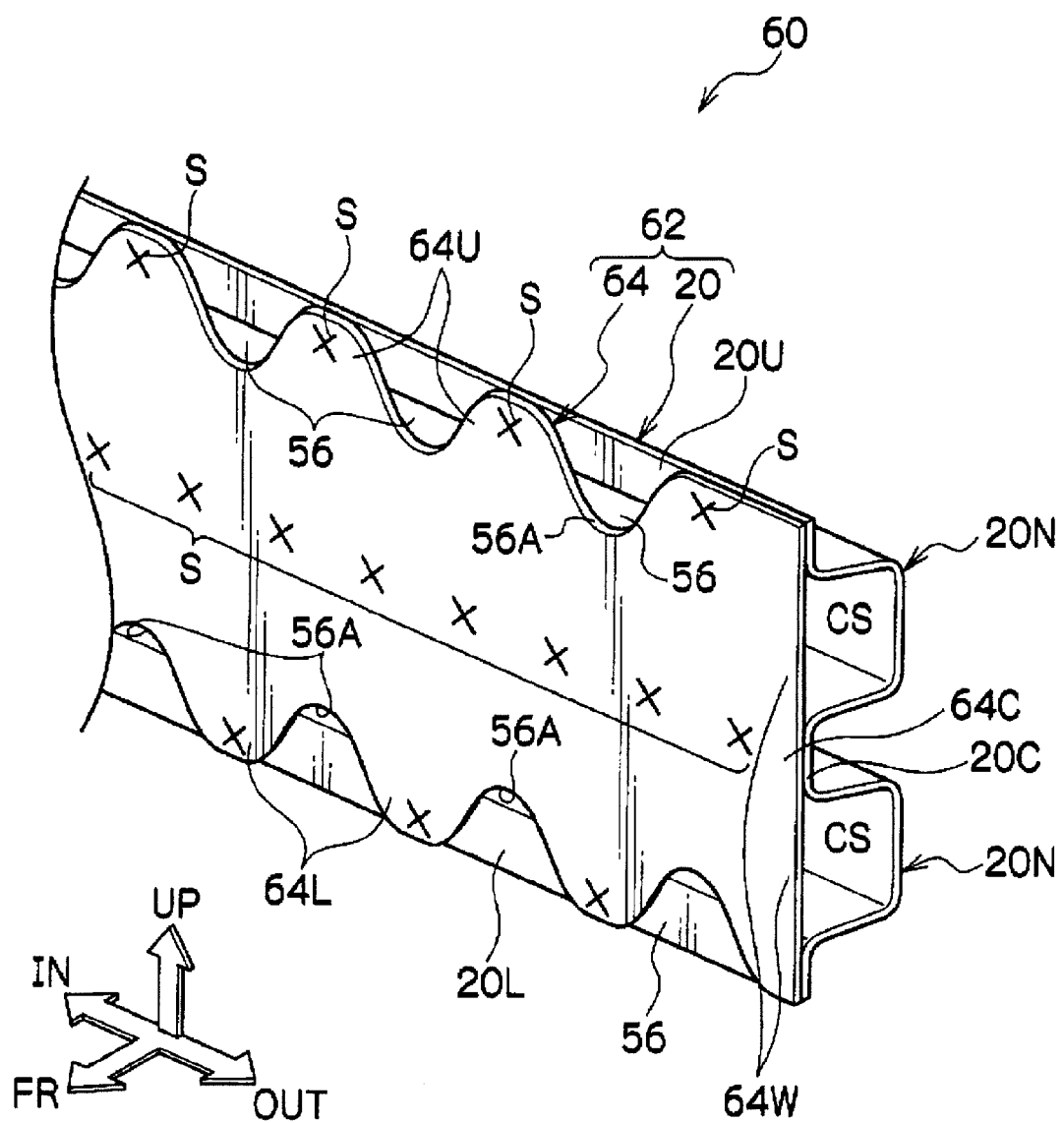
FIG. 14 is an enlarged perspective view illustrating an end portion of bumper reinforcement according to a fifth exemplary embodiment of the present invention.

FIG. 14 is a perspective view illustrating a portion of bumper reinforcement 62 configuring a front bumper 60 according to a fifth exemplary embodiment of the present invention. As shown in FIG. 14, in the front bumper 60, the position in the vehicle width direction where cutout portions 56 are disposed differs between the upper flange 64U and the lower flange 64L of the outer panel 64 that configures the bumper reinforcement 62 in combination with the inner panel 20.

In the outer panel 64, respective wall portions 64W are formed between the upper flange 64U, the center flange 64C and the lower flange 64L. The upper flange 64U, the center flange 64C and the lower flange 64L are joined to the upper flange 20U, the center flange 20C and the lower flange 20L by spot welding.

More specifically, in the bumper reinforcement 62 the position of the spot welding points S are alternately disposed along the vehicle width direction between the upper flange 64U and the lower flange 64L (in a staggered pattern), and the vehicle width direction positions of the top and bottom cutout portions 56 are accordingly displaced from each other. In the front bumper 60, the positions of the ED holes opening the wall portions 64W of the bumper reinforcement 62 are accordingly also displaced in the width direction from each other between the top and bottom ED holes.

In the present exemplary embodiment the spot welding points S between the center flange 64C and the center flange 20C are disposed on respective straight lines connecting the spot welding points S between the upper flange 64U and the upper flange 20U to the spot welding points S between the lower flange 64L and the lower flange 20L. Namely, the spot welding points S of the bumper reinforcement 62 are disposed in an overall substantially triangular wave pattern. Other portions of the configuration of the front bumper 60, including non-illustrated portions, are configured similarly to corresponding portions of the front bumper 50.

Consequently, fundamentally similar operation enables fundamentally similar advantageous effects to also be obtained by the front bumper 60 according to the fifth exemplary embodiment to those of the front bumper 50 according to the fourth exemplary embodiment. In the front bumper 60, the cutout portions 56 of the upper flange 64U and the lower flange 64L are displaced from each other in the vehicle width direction, enabling a rapid change in the section modulus (section force) to bending of the bumper reinforcement 62 during a collision to be suppressed. Namely, the bumper reinforcement 62 has raised bending strength compared to that of the bumper reinforcement 52.

In the fourth and the fifth exemplary embodiments examples are given in which the cutout portions 56 are formed between all of the spot welding points S, however the present invention is not limited thereto. Consequently, for example, configuration may be made with the cutout portions 56 formed at some of the portions between the spot welding points S of the bumper reinforcement 52, 62, including locations where stress concentration occurs with bending. In the fourth and the fifth exemplary embodiments, the cutout portions 56 are illustrated as an example of non-continuous portions, however the present invention is not limited thereto. For example, configuration may be made with portions between the spot welding points S in the upper flange 54U, 64U and the lower flange 54L, 64L formed in bead shapes that are separated towards the front from the upper flange 20U and the lower flange 20L. It is also difficult for load to act in the spot welding points S splitting direction in such a configuration, and similar advantageous effects can be obtained to those of the fourth and fifth exemplary embodiments.

Figure 25:
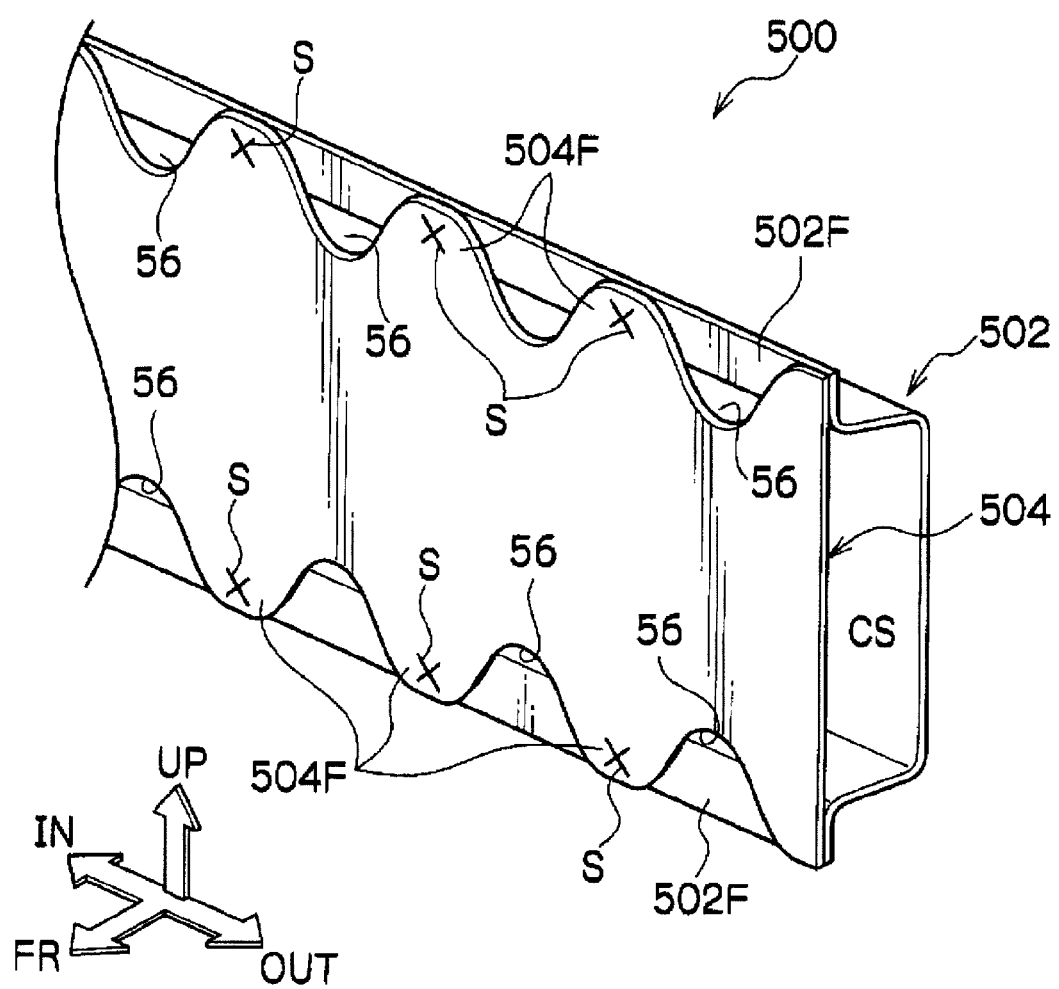
FIG. 25 is a perspective view illustrating a portion of bumper reinforcement according to a first reference example.
Figure 26:
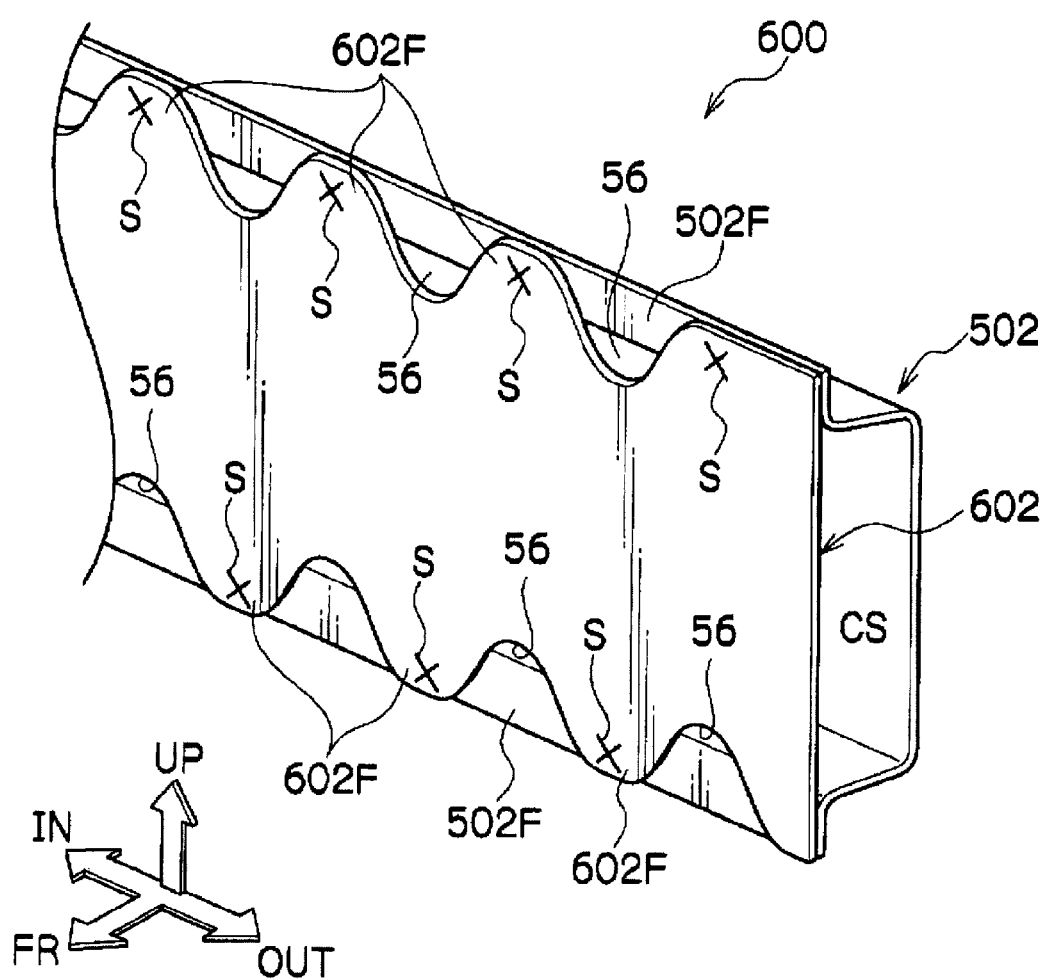
FIG. 26 is a perspective view illustrating a portion of bumper reinforcement according to a second reference example.

As reference examples not included in the present invention, configuration may be made with the cutout portions 56 provided to bumper reinforcement 500, 600 having a single closed cross-section, as shown in FIG. 25 and FIG. 26. The bumper reinforcement 500 according to a first reference example of FIG. 25 is configured with upper and lower flanges 502F of an inner panel 502 with hat shaped cross-section opening towards the front joined to upper and lower flanges 504F of a flat plate shaped outer panel 504. The cutout portions 56 are formed between the spot welding points S of the upper and lower flanges 504F. The bumper reinforcement 600 according to the second reference example of FIG. 26 is configured with flanges 502F of an inner panel 502 joined to upper and lower flanges 602F of a flat plate shaped outer panel 602. Cutout portions 56 are formed between the spot welding points S offset from each other in the vehicle width direction between the upper and lower flanges 602F. Splitting of the spot welding points S with bending during a collision is also suppressed in the bumper reinforcements 500, 600 according to these reference examples by an operational effect similar to that of the fourth and fifth exemplary embodiments. The cutout portions 56 that communicate each closed cross-section CS with external portions also function as ED holes.

Moreover, in the respective exemplary embodiments described above, while examples are given in which the upper flanges 22U, 34U, 44U, 54U, 64U, the lower flanges 22L, 34L, 44L, 54L, 64L and the center flanges 22C, 34C, 44C, 54C, 64C are disposed on the same straight line as the wall portions 22W, 34W, 44W, 54W, 64W in cross-section viewed from the side, the present invention is not limited thereto. For example, configurations of modified examples as illustrated in FIG. 15 to FIG. 18 may be adopted.

First Modified Example

Figure 15:
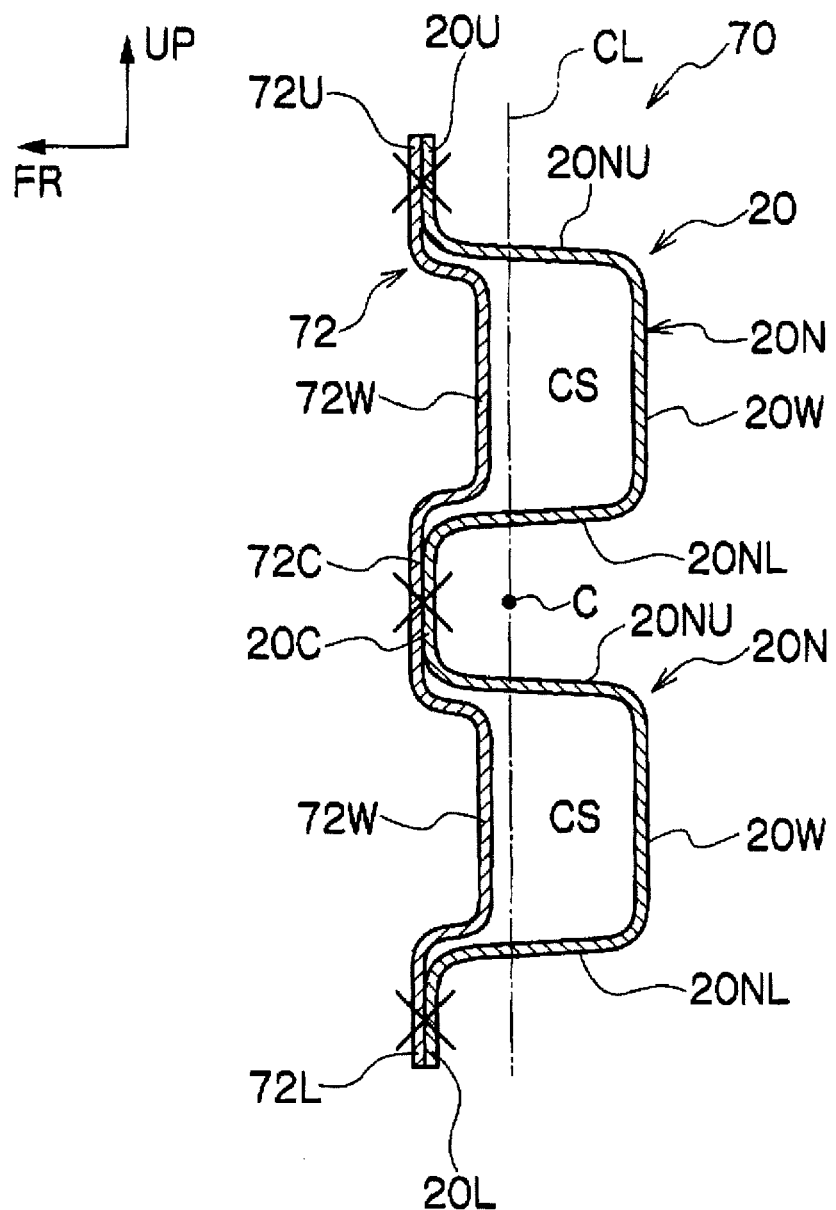
FIG. 15 is a cross-section illustrating bumper reinforcement according to a first modified example of an exemplary embodiment of the present invention.

A first modified example illustrated in FIG. 15 includes an outer panel 72 that configures bumper reinforcement 70 in combination with an inner panel 20. The outer panel 72 is formed with respective wall portions 72W between an upper flange 72U, a center flange 72C and a lower flange 72L. The upper flange 72U, the center flange 72C and the lower flange 72L are joined by spot welding to an upper flange 20U, a center flange 20C and a lower flange 20L. In the outer panel 72 the wall portions 72W that configure closed cross-sections CS in combination with indented portions 20N are positioned at a vehicle rear direction of the upper flange 72U, the center flange 72C and the lower flange 72L.

Second Modified Example

Figure 16:
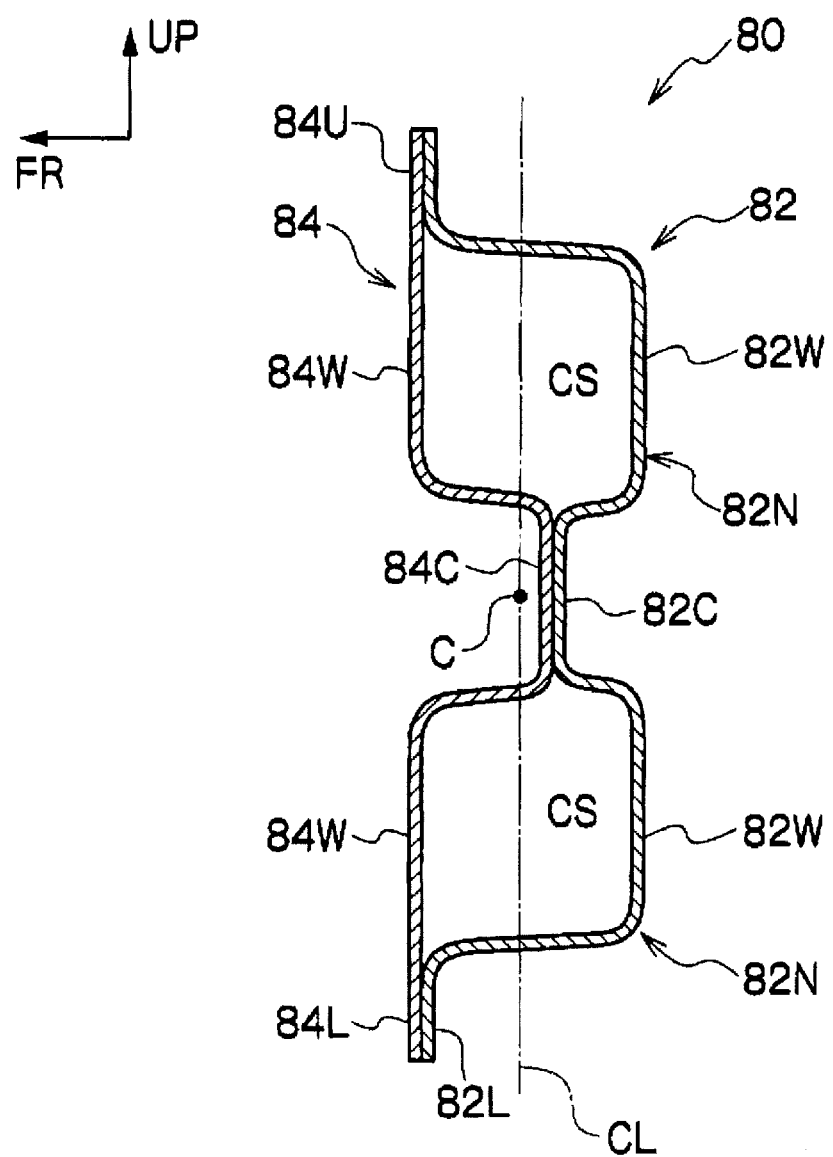
FIG. 16 is a cross-section illustrating bumper reinforcement according to a second modified example of an exemplary embodiment of the present invention.

A second modified example illustrated in FIG. 16 is bumper reinforcement 80 configured by joining together an inner panel 82 and an outer panel 84. The inner panel 82 is formed with two indented portions 82N between an upper flange 82U and a lower flange 82L. A center flange 82C is disposed between the two indented portions 82N. The center flange 82C is disposed to the vehicle rear of the upper and lower flanges 82U, 82L. The outer panel 84 is formed with respective wall portions 84W between an upper flange 84U, a center flange 84C and a lower flange 84L. The upper flange 84U, the center flange 84C and the lower flange 84L are joined by spot welding to the upper flange 82U, the center flange 82C and the lower flange 82L. In the outer panel 84, the upper flange 84U and the lower flange 84L are disposed on the same straight line in cross-section as viewed from the side as the wall portions 84W that configure closed cross-sections CS in combination with the indented portions 82N. The center flange 84C is however disposed to the vehicle rear of the straight line referred to above.

Third Modified Example

Figure 17:
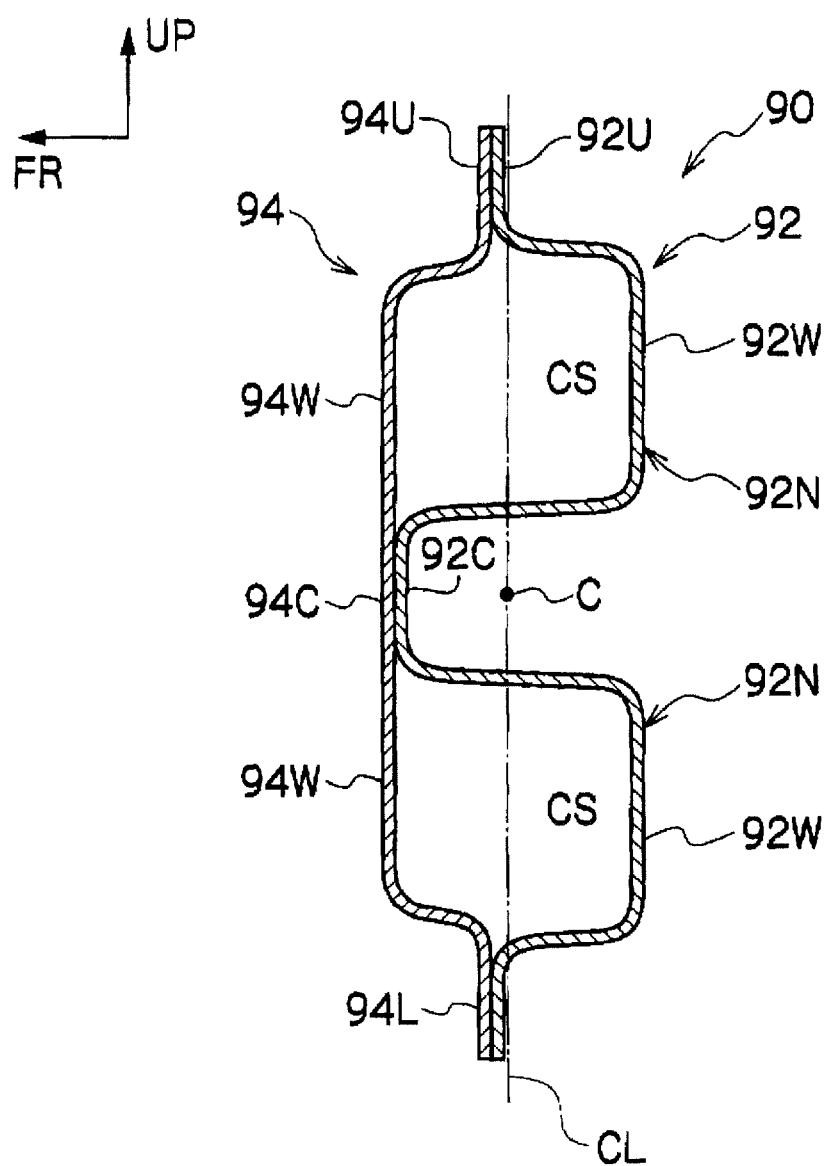
FIG. 17 is a cross-section illustrating bumper reinforcement according to a third modified example of an exemplary embodiment of the present invention.

A third modified example illustrated in FIG. 17 is bumper reinforcement 90 configured by joining together an inner panel 92 and an outer panel 94. The inner panel 92 is formed with two indented portions 92N between an upper flange 92U and a lower flange 92L. A center flange 92C is disposed between the two indented portions 92N. The center flange 92C is disposed to the vehicle front of the upper and lower flanges 92U, 92L. The outer panel 94 is formed with respective wall portions 94W between an upper flange 94U, a center flange 94C and a lower flange 94L. The upper flange 94U, the center flange 94C and the lower flange 94L are joined to the upper flange 92U, the center flange 92C and the lower flange 92L by spot welding. In the outer panel 94, the center flange 94C is disposed on the same straight line in cross-section viewed from the side as the wall portions 94W configuring closed cross-sections CS in combination with the indented portions 92N. The upper flange 94U and the lower flange 94L are, however, disposed to the vehicle rear of the straight line referred to above.

Fourth Modified Example

Figure 18:
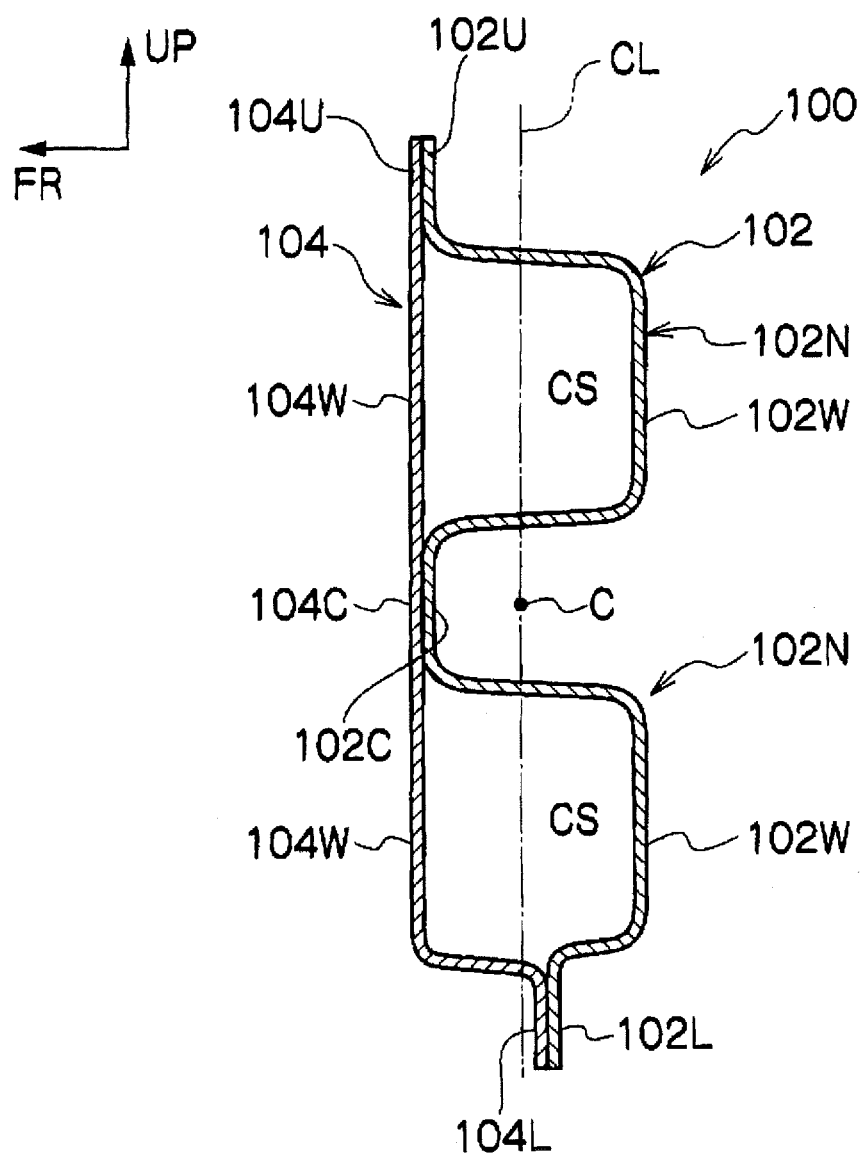
FIG. 18 is a cross-section illustrating bumper reinforcement according to a fourth modified example of an exemplary embodiment of the present invention.

A fourth modified example illustrated in FIG. 18 is bumper reinforcement 100 configured by joining together an inner panel 102 and an outer panel 104. The inner panel 102 is formed with two indented portions 102N between an upper flange 102U and a lower flange 102L. A center flange 102C is disposed between the two indented portions 102N. The lower flange 102L is disposed to the vehicle rear of the flanges 102U, 102C that are disposed above the lower flange 102L. The outer panel 104 is formed with respective wall portions 104W between an upper flange 104U, a center flange 104C and a lower flange 104L. The upper flange 104U, the center flange 104C and the lower flange 104L are joined to the upper flange 102U, the center flange 102C and the lower flange 102 L by spot welding. In the outer panel 104, the upper flange 104U and the center flange 104C are disposed on the same straight line in cross-section viewed from the side as the wall portions 104W configuring closed cross-sections CS in combination with the indented portions 102N. The lower flange 104L is, however, disposed to the vehicle rear of the straight line referred to above. Note that configuration may be made in a shape in which the top and bottom of the bumper reinforcement 100 are inverted.

As can be seen from the first to the fourth modified examples, the present invention may be configured with at least one portion of the upper flange, the lower flange and the center flange formed along the same flat plane as a wall portion on the load input side of the closed cross-sections CS, or disposed further to the vehicle front than the wall portion. Preferably, plural flanges, out of the three or more flanges disposed separated from each other in the top-bottom direction, are positioned on the same straight line in cross-section viewed from the side as a wall portion on the load input side of the closed cross-sections CS, or positioned further towards the vehicle front than the wall portion. Moreover, while not shown in the drawings, an example of positioning the upper flange and the lower flange of the outer panel further to the vehicle front than the wall portion, is a configuration in which at least one of the upper and/or lower flanges is angled with respect to the wall portion such that the top and bottom ends of the upper and lower flanges (the free ends) are positioned further to the vehicle front than the flange bases (on the wall portion side).

While in the second and third exemplary embodiments, there were examples illustrated in which the beads 36 projected out inside the closed cross-sections CS, the present invention is not limited thereto. Configuration may be made, for example, as in the modified example illustrated in FIG. 19.

Fifth Modified Example

Figure 19:
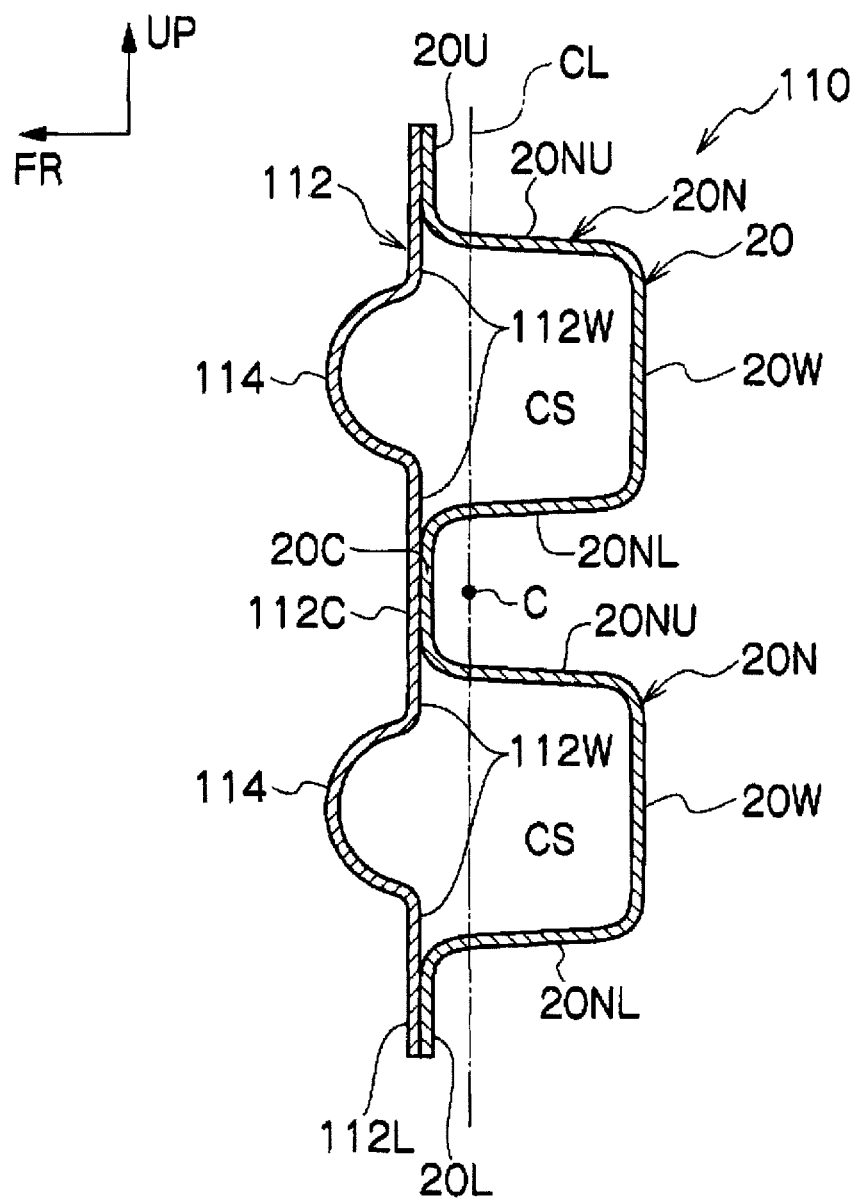
FIG. 19 is a cross-section illustrating bumper reinforcement according to a fifth modified example of an exemplary embodiment of the present invention.

A fifth modified example illustrated in FIG. 19 includes an outer panel 112 that configures bumper reinforcement 110 in combination with an inner panel 20. The outer panel 112 is formed with respective wall portions 112W between an upper flange 112U, a center flange 112C and a lower flange 112L. The upper flange 112U, the center flange 112C and the lower flange 112L are joined to an upper flange 20U, a center flange 20C and a lower flange 20L by spot welding. In the outer panel 112, beads 114 project out towards the vehicle front from top-bottom direction central portions of the wall portions 112W.

As can be seen from the fifth modified example, configuration may be made such that at least one portion of the upper flange, the lower flange and the center flange is disposed, with respect to the wall portions on the load input side of the closed cross-sections CS, on the same straight line as the wall portions or offset to the load input side therefrom.

Figure 20:
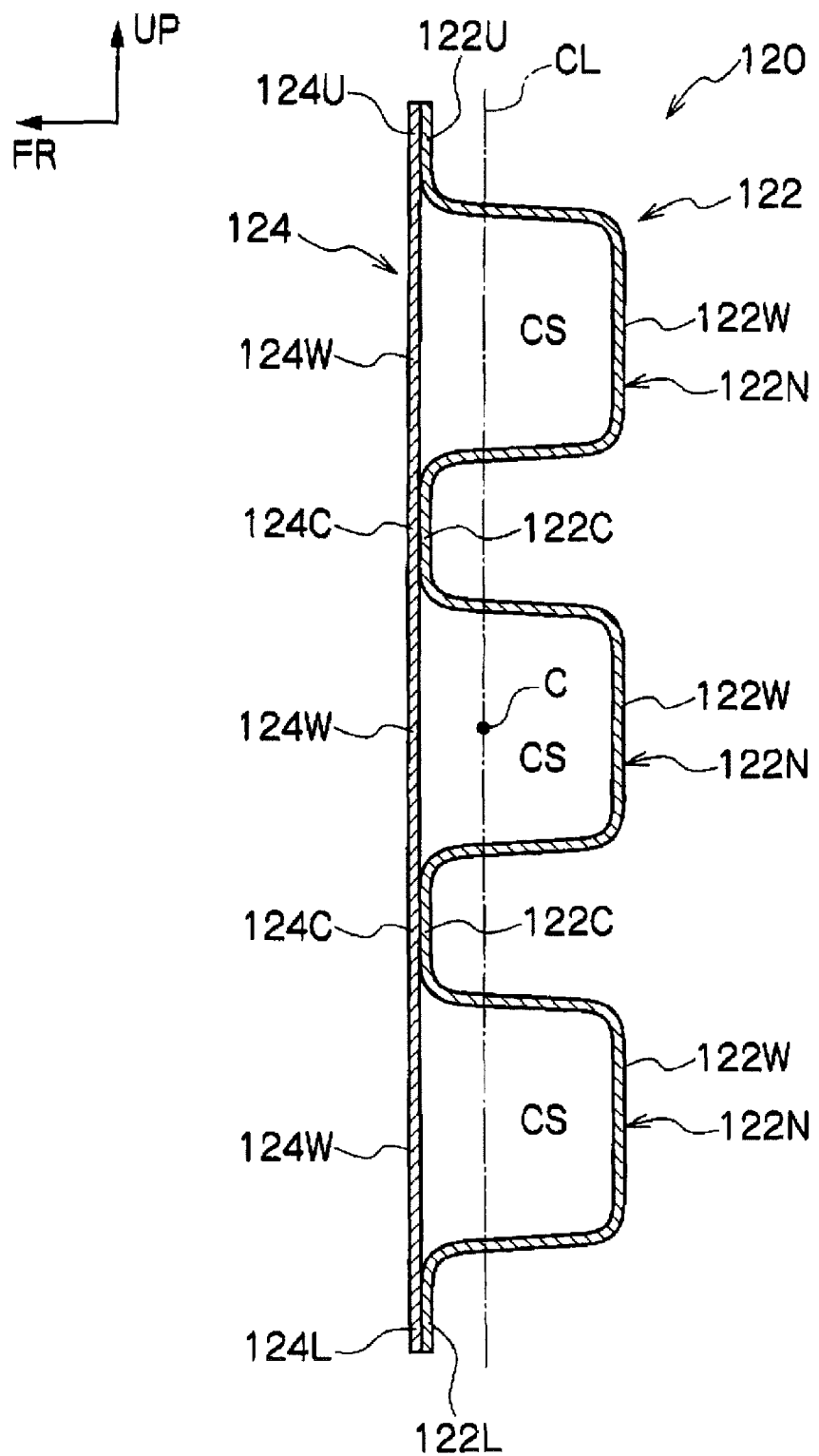
FIG. 20 is a cross-section illustrating bumper reinforcement according to a sixth modified example of an exemplary embodiment of the present invention.

Furthermore, whereas in each of the above exemplary embodiments, examples formed with two of the closed cross-sections CS are illustrated, the present invention is not limited thereto, and configuration may be made as in the modified example illustrated in FIG. 20.

Sixth Modified Example

In the sixth modified example illustrated in FIG. 20, bumper reinforcement 120 is configured by joining together an inner panel 122 and an outer panel 124. The inner panel 122 is formed with three indented portions 122N and two center flanges 122C formed between an upper flange 122U and a lower flange 122L. The outer panel 124 is formed with three wall portions 124W between an upper flange 124U, two center flanges 124C and a lower flange 124L, the wall portions 124W configuring closed cross-sections CS in combination with three indented portions 122N. The upper flange 124U, the two center flanges 124C and the lower flange 124L are joined to the upper flange 122U, the two center flanges 122C and the lower flange 122L by spot welding. In the outer panel 124, the upper flange 124U, the center flanges 124C and the lower flange 124L are formed along the same flat plane as the wall portions 124W. Note that configuration may be made with four or more closed cross-sections CS formed (side-by-side) from top-to-bottom.

Note that whereas in each of the exemplary embodiments, examples have been given in which the outer panels 22, 34, 44, 54, 64, 72, 84, 94, 104, 112, 124 are single members, the present invention is not limited thereto. For example, configuration may be made as in the modified examples illustrated in FIG. 21 and FIG. 22.

Seventh Modified Example

Figure 21:
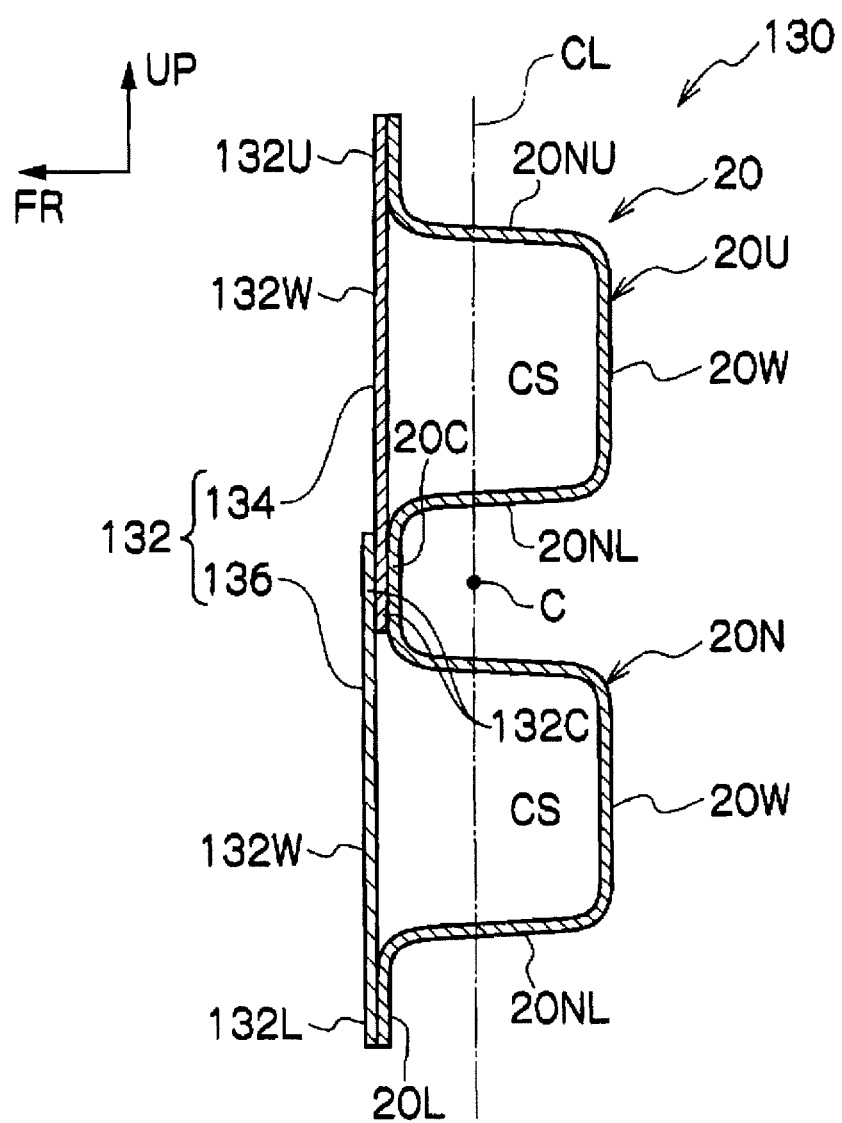
FIG. 21 is a cross-section illustrating bumper reinforcement according to a seventh modified example of an exemplary embodiment of the present invention.

A seventh modified example illustrated in FIG. 21 includes an outer panel 132 that configures bumper reinforcement 130 in combination with an inner panel 20. The outer panel 132 is formed with respective wall portions 132W between an upper flange 132U, a center flange 132C and a lower flange 132L. The upper flange 132U, the center flange 132C and the lower flange 132L are joined to an upper flange 20U, a center flange 20C and a lower flange 20L by spot welding. The outer panel 132 is a two component configuration of an upper panel 134 and a lower panel 136. The upper panel 134 includes an upper flange 132U, a center flange 132C and a top side wall portion 132W. The lower panel 136 includes a lower flange 132L, a center flange 132C and a bottom side wall portion 132W. In this modified example the center flanges 132C are configured by overlapping portions of the upper panel 134 and the lower panel 136.

Eighth Modified Example

Figure 22:
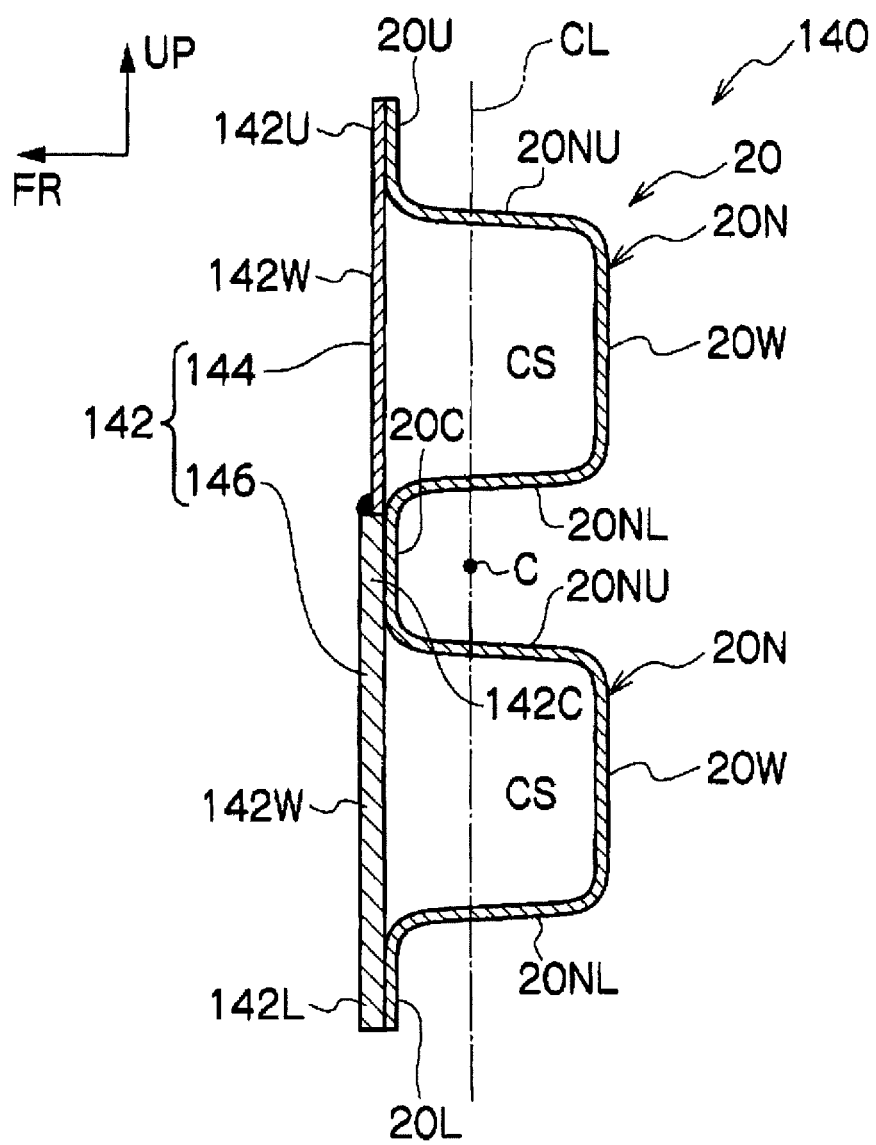
FIG. 22 is a cross-section illustrating bumper reinforcement according to an eighth modified example of an exemplary embodiment of the present invention.

An eighth modified example illustrated in FIG. 22 includes an outer panel 142 configuring bumper reinforcement 140 in combination with an inner panel 20. The outer panel 142 is formed with respective wall portions 142W between an upper flange 142U, a center flange 142C, and a lower flange 142L. The upper flange 142U, the center flange 142C and the lower flange 142L are joined to an upper flange 20U, a center flange 20C and a lower flange 20L by spot welding. The outer panel 142 is configured by coupling an upper panel 144 and a lower panel 146 while having a thickness difference. In this modified example, the wall thickness of the lower panel 146 is thicker than the upper panel 144, however the reverse is possible. In this modified example the center flange 142C is provided by the thick-walled lower panel 146, however the center flange 142C may be provided by the upper panel 144 on the thin walled side.

The present invention is also not limited by each of the exemplary embodiments and modified examples given above, and it is possible to implement various further modifications. Configuration may be made with appropriate combinations of configuration features drawn from each of the above exemplary embodiments and modified examples.

Moreover, whereas in each of the above exemplary embodiments, examples are given of the bumper reinforcement structure of the present invention applied to a front bumper, the present invention is not limited thereto. For example, the bumper reinforcement structure according to the present invention may be applied to a rear bumper.

Furthermore, whereas in each of the above exemplary embodiments, examples are given of spot welding as an example of joining inner panels such as the inner panel 20 to outer panels such as the outer panel 22, the present invention is not limited thereto. For example, configuration may be made in which inner panels such as the inner panel 20 and outer panels such as the outer panel 22 are joined together by such methods as adhesive or rivet fastening.

Moreover, whereas in each of the above exemplary embodiments, the bumper reinforcement 12, 32, 42, 52, 62, 70, 80, 90, 100, 110, 120, 130, 140 is fastened to the crush boxes 18 by the weld nuts 24 and the bolts 26, the present invention is not limited thereto. For example, bumper reinforcement such as the bumper reinforcement 12 may be coupled (fixed) to the crush boxes 18 by welding.

The invention claimed is:

1. A bumper reinforcement structure comprising:
an inside member disposed along a vehicle width direction at a vehicle front-rear direction end portion of a vehicle and supported from a vehicle front-rear direction central side by a framework member, the inside member being formed with plural indented portions provided between three or more joint sections separated from each other in the vehicle top-bottom direction and opening towards the opposite side to the framework member side;
an outside member being formed with three or more joint sections and a wall portion that configures a closed cross-section in combination with the indented portion, the three or more joint sections respectively joined to each of the inside member joint sections, and the three or more joint sections and at least a portion including both vehicle top-bottom direction end portions of the wall portion are disposed as each other on a same straight line in a cross-section orthogonal to a length direction of the closed cross-section; and
a bead with length direction running along the vehicle width direction being formed to the wall portion configuring the outside member;
wherein centroid of the bumper reinforcement is positioned at a wall portion side from an end at a projecting side of the bead formed from the wall portion,
non-continuous portions are provided at least at portions between the adjacent joint sections in the vehicle width direction,
the non-continuous portions are a plurality of cutout portions formed in the vehicle width direction at the top end portion and the bottom end portion of the outside member, and
the closed cross-section is in communication with external portions through the cut out portions.

2. The bumper reinforcement structure of claim 1 wherein:
the inside member is supported by the framework member at both the vehicle width direction end sides; and
the bead is formed between locations of support by the framework member.

3. The bumper reinforcement structure of claim 1 wherein:
non-continuous portions are provided at at least portions between the adjacent joint sections in the vehicle width direction at an inside member side or an outside member side of the joint sections.

4. The bumper reinforcement structure of claim 1 wherein the vehicle width direction positions of the non-continuous portions are offset between the joint sections positioned at the vehicle top-bottom direction top end and the joint sections positioned at the vehicle top-bottom direction bottom end.

5. The bumper reinforcement structure of claim 1 wherein the non-continuous portions are formed at the joint section of the outside member so as to communicate the closed cross-sections formed by the inside member and the outside member with a portion external to the closed cross-sections.

6. The bumper reinforcement structure of claim 1 wherein:
the outer panel is formed with an upper panel and a lower panel, and the upper panel and the lower panel are overlapped at a central portion in the vehicle top-bottom direction.

7. The bumper reinforcement structure of claim 1 wherein:
the outer panel is formed with an upper panel and a lower panel, and a thickness of the upper panel and a thickness of the lower panel are different from each other.

* * * * *